(12) United States Patent
Shirazipour et al.

(10) Patent No.: US 11,509,542 B2
(45) Date of Patent: Nov. 22, 2022

(54) FIRST NETWORK NODE, THIRD NETWORK NODE, AND METHODS PERFORMED THEREBY, FOR HANDLING A PERFORMANCE OF A RADIO ACCESS NETWORK

(71) Applicant: Telefonaktiebolaget LM Ericsson (publ), Stockholm (SE)

(72) Inventors: Meral Shirazipour, Santa Clara, CA (US); Julien Forgeat, San Jose, CA (US); Jaeseong Jeong, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 17/052,140

(22) PCT Filed: Apr. 24, 2019

(86) PCT No.: PCT/EP2019/060451
§ 371 (c)(1),
(2) Date: Oct. 30, 2020

(87) PCT Pub. No.: WO2019/211134
PCT Pub. Date: Nov. 7, 2019

(65) Prior Publication Data
US 2021/0119881 A1 Apr. 22, 2021

Related U.S. Application Data

(60) Provisional application No. 62/666,042, filed on May 2, 2018.

(51) Int. Cl.
*H04L 41/16* (2022.01)
*G06N 20/00* (2019.01)
(Continued)

(52) U.S. Cl.
CPC .............. *H04L 41/16* (2013.01); *G06N 3/08* (2013.01); *G06N 20/00* (2019.01); *H04L 41/046* (2013.01);
(Continued)

(58) Field of Classification Search
CPC ... H04L 41/16; H04L 41/046; H04L 41/0823; H04L 41/145; H04L 41/0893;
(Continued)

(56) References Cited

U.S. PATENT DOCUMENTS

2013/0122885 A1* 5/2013 Kojima .............. G05B 23/0251
455/418
2016/0165472 A1 6/2016 Gopalakrishnan et al.
(Continued)

OTHER PUBLICATIONS

International Search Report and Written Opinion of the International Searching Authority, PCT/EP2019/060451, dated Jun. 13, 2019, 10 pages.
(Continued)

*Primary Examiner* — Jamal Javaid
*Assistant Examiner* — Shawn D Miller
(74) *Attorney, Agent, or Firm* — Sage Patent Group

(57) ABSTRACT

A method performed by a first network node operating in a communications network is disclosed. The method is for handling a performance of a radio access network (RAN) including one or more radio network nodes. The first network node determines a configuration of one or more parameters in the RAN based on one or more machine-implemented reinforcement learning (RL) procedures to optimize the performance of the RAN based on the one or more parameters. The RL procedures are further based on at least one of: i) one or more physical characteristics of a deployment of the RAN, ii) one or more radio characteristics of the RAN, and iii) a location of users or traffic load in the RAN. The first network node then initiates providing one or
(Continued)

more indicators of the determined configuration to a second network node.

30 Claims, 14 Drawing Sheets

(51) Int. Cl.
    *G06N 3/08*     (2006.01)
    *H04L 41/046*     (2022.01)
    *H04L 41/0823*     (2022.01)
    *H04L 41/14*     (2022.01)
    *H04W 24/02*     (2009.01)
    *H04W 28/08*     (2009.01)

(52) U.S. Cl.
    CPC ........ *H04L 41/0823* (2013.01); *H04L 41/145* (2013.01); *H04W 24/02* (2013.01); *H04W 28/08* (2013.01)

(58) Field of Classification Search
    CPC .......... G06N 3/08; G06N 20/00; G06N 7/005; G06N 3/006; G06N 3/0454; G06N 3/086; H04W 24/02; H04W 28/08
    See application file for complete search history.

(56) References Cited

U.S. PATENT DOCUMENTS

2019/0379468 A1* 12/2019 Roessel ................. H04W 24/10
2020/0311476 A1* 10/2020 Han ....................... G06V 20/70

OTHER PUBLICATIONS

Mnih, Volodymyr et al., "Asynchronous Methods for Deep Reinforcement Learning," accessed on the Internet on Oct. 26, 2020 at: https://arxiv.org/abs/1602.01783, 19 pages.
Wikipedia, "Evolutionary Strategy," accessed on the Internet on Oct. 26, 2020 at: https://en.wikipedia.org/wiki/Evolution_strategy, 3 pages.
Schulman, John et al., "Proximal Policy Optimization," accessed on the Internet on Oct. 26, 2020 at: https://blog.openai.com/openai-baselines-ppo, 7 pages.
The Ray Team, "RLlib: Scalable Reinforcement Learning," accessed on the Internet on Oct. 26, 2020 at: https://ray.readthedocs.io/en/latest/rllib.html, 3 pages.
scipy.org, "Optimization and root finding (scipy.optimize)," accessed on the Internet on Oct. 26, 2020 at: https://docs.scipy.org/doc/scipy/reference/optimize.html, 10 pages.
Zheng, K. et al., "Big Data Driven Optimization for Mobile Networks towards 5G, IEEE Network," 30(1), 2016, pp. 44-51.
Zhang, C., Deep Learning in Mobile and Wireless Networking: A Survey. IEEE Communications Surveys & Tutorials, 2018, available at: https://arxiv.org/pdf/1803.04311.pdf, 43 pages.
Evans, R. et al., "DeepMind AI Reduces Google Data Centre Cooling Bill by 40%," 2018, available at https://deepmind.com/blog/deepmind-ai-reduces-google-data-centre-cooling-bill-40/, 4 pages.
Chinchali, S. et al., "Cellular network traffic scheduling with deep reinforcement learning," 2018, National Conference on Artificial Intelligence (AAAI), available at: https://asl.stanford.edu/wp-content/papercite-data/pdf/Chinchali.ea.AAAI18.pdf, 9 pages.
O'Shea, T.J., "Deep reinforcement learning radio control and signal detection with KeRLym, a Gym RL agent," 2016, available at: https://arxiv.org/pdf/1605.09221.pdf, 7 pages.

* cited by examiner a)

b)

a)

b)

a)

b)

FIRST NETWORK NODE, THIRD NETWORK NODE, AND METHODS PERFORMED THEREBY, FOR HANDLING A PERFORMANCE OF A RADIO ACCESS NETWORK

CROSS REFERENCE TO RELATED APPLICATIONS

This application is a 35 U.S.C. § 371 national stage application of PCT International Application No. PCT/EP2019/060451 filed on Apr. 24, 2019, which in turn claims domestic priority to U.S. Provisional Patent Application No. 62/666,042, filed on May 2, 2018, the disclosures and content of which are incorporated by reference herein in their entirety.

TECHNICAL FIELD

The present disclosure relates generally to a first network node, and methods performed thereby, for handling a performance of a radio access network. The present disclosure also relates generally to a third network node, and methods performed thereby, for handling a performance of a radio access network. The present disclosure further relates generally to computer programs and computer-readable storage mediums, having stored thereon the computer programs to carry out these methods.

BACKGROUND

Cellular Network

Mobile Network Operators (MNOs) may need to design their network's architecture to satisfy their requirements in terms of capacity, coverage, and quality of service (QoS) versus cost. Network planning phases may include traffic forecasting, dimensioning, expansion planning and redundancy needs estimation to correctly set these requirements. This phase may also include static initial setting of many radio access network (RAN) parameters.

Once a mobile network is up and running, it may still need constant network optimization, also known as tuning, to evolve with user needs and usage change patterns.

Current cellular RANs may be understood to have evolved architecturally to what is called cloud-RAN or centralized RAN (C-RAN). An example of a simplified C-RAN architecture is schematically illustrated in FIG. 1. This new cellular network design may comprise having remote radio units (RRUs), such as a macro RRU 11, and a small cell RRU 12 an example of which depicted in FIG. 1, split from the baseband processing (BB) units, called the Digital Units (DUs). FIG. 1 depicts also an example of a macro Radio Unit (RU) with baseband (BB) at site 13, and an example of a DU as a Centralized BB Hub 14 in a BB hub that may also be in the cloud, connected to the RRUs via a respective Common Public Radio Interface (CPRI). This type of design may be understood to allow more flexibility with a centralized or distributed deployment depending on the network planning and design constraints.

The DUs, which may be programmed directly or via Operations Support System (OSS), may control hundreds of RAN parameters, such as Key Performance Indicators (KPIs) etc. As MNOs evolve towards 5G networks, the number of parameters to optimize will increase by factors of tens or hundreds. Network heterogeneity and coexistence with non-licensed bands will make network planning and optimization extremely difficult. This is one of the reasons behind new research and development trends using machine learning/deep learning techniques to optimize resources in these networks.

There may be many RAN parameters configured during network planning and later optimized. Example RAN parameters may include antenna tilt, transmit power, antenna azimuth, etc. One of the most basic configurations during network planning, and in the near future, in real-time network optimization, or Self-Organizing Networks (SON), may comprise optimally tilting the antenna in the right angle to optimize coverage, throughput, and power consumption.

Tilt

The antenna tilt may be performed by mechanical means or more commonly by electrical tilt. Tilting may affect the cell edge, e.g., tilting down will shrink the cell edge. Tilting may affect throughput, coverage, and power usage. Moreover, uplink (UL) traffic may be mostly affected by tilt. The Remote Electrical Tilt feature may be called RET. RET may be controlled by the DU, which may be itself controlled via direct configuration, or via OSS. It is to be noted that not all radio unit models may support RET, which may be considered during network planning phases. Currently, RET may take about 5 seconds to stabilize making hourly tilt optimization frequency possible. Most of the tilt configuration today may be done statically.

There currently exist certain challenges. 5G networks are complex and may have thousands of parameters to optimize. It will be impossible for a human operator to fully optimize the network for various traffic and map/building settings.

Machine Learning

Reinforcement Learning (RL) is a rapidly evolving machine learning (ML) technology that may be understood to enable a real-time automation, while continuously training an agent over a feedback loop. The skilled person will be familiar with reinforcement learning and reinforcement learning agents. Briefly, reinforcement learning may be understood as a type of machine learning process whereby a reinforcement learning agent, e.g., an algorithm, may be used to take decisions, e.g., perform actions, on a system to adjust the system according to an objective, which may, for example, comprise moving the system towards an optimal or preferred state of the system. An agent may be understood as an entity that may interact with the environment and decide actions to be performed. An action may be understood as a process to execute that may imply one or more changes in the traffic of the network. A state may be understood as a set of parameters that may describe the network status at a certain time. The reinforcement learning agent may receive a reward based on whether the action changes the system in compliance with the objective, e.g., towards the preferred state, or against the objective, e.g., further away from the preferred state. A reward may be understood as a value that may indicate how desirable a certain state is. The logic of the agent may be required to maximize the overall reward of the state changes that may be caused by the decided actions. The reinforcement learning agent may therefore adjust parameters in the system with the goal of maximizing the rewards received. Use of a reinforcement learning agent may be understood to allow decisions to be updated, e.g., through learning and updating a model associated with the reinforcement learning agent, dynamically as the environment changes, based on previous decisions, or actions, performed by the reinforcement learning agent. Expressed more formally, a reinforcement learning agent may receive an observation from the environment in a state S and may select an action to maximize the expected future reward r. An environment may be understood as an element the agent may interact with, e.g., a network. Based on the expected future rewards, a value function V for each state may be calculated and an optimal policy π that may maximize the long term value function may be derived.

RL with neural networks may be understood to empower an agent to cope with complex network status and policies.

Recent works such as Reference [1], highlight the possibilities and challenges with using big data technique for network optimization in general. Large amounts of RAN data are available: evolved Node B (eNB) configuration information, resource status, interference, handover/mobility, signalling messages, and of course, radio signal measurements. More recent publications such as Reference [2] survey existing works using specifically RL in mobile network optimization. They conclude that this area remains mainly unexplored and that network optimizations similar to Google DeepMind's achievements may be possible, e.g., 40% reduction in data center cooling of Reference [3]. Reference [4] presents an RL-based optimization of high volume non-real time traffic scheduling for Internet of Things (IoT) wireless use cases. Reference [5] used RL to show that the technique may replace domain experts, which may be usually required for heuristics and search strategies, to solve a problem of radio frequency selection.

Despite recent RL success stories, there have been several challenges left in applying RL to the network planning and operation. First, a sophisticated radio network simulator may require a heavy computation. Second, the algorithms for RL in intelligent network operation may need to be studied and investigated.

SUMMARY

It is an object of embodiments herein to improve the handling of a performance of a radio access network.

According to a first aspect of embodiments herein, the object is achieved by a method, performed by a first network node. The method is for handling a performance of a radio access network. The radio access network comprises one or more radio network nodes. The first network node operates in a communications network. The first network node determines a configuration of one or more parameters in the radio access network. The determining is based on one or more machine-implemented reinforcement learning procedures to optimize the performance of the radio access network based on the one or more parameters. The one or more machine-implemented reinforcement learning procedures are further based on at least one of: i) one or more physical characteristics of a deployment of the radio access network, ii) one or more radio characteristics of the radio access network, and iii) a location of users or traffic load in the radio access network. The first network node then initiates providing one or more indicators of the determined configuration to a second network node operating in the communications network.

According to a second aspect of embodiments herein, the object is achieved by a method, performed by a third network node. The method is for handling the performance of the radio access network. The radio access network comprises the one or more radio network nodes. The first network node operates in the communications network. The third network node obtains data collected from a respective subset of the radio network nodes. The respective subset covers a part of a deployment of the radio access network having a first subset of at least one of: i) the one or more physical characteristics of the deployment of the radio access network, ii) the one or more radio characteristics of the radio access network, and iii) the location of users or the traffic load. The data indicates one or more parameters in the radio access network. The third network node performs a machine-implemented reinforcement learning procedure, based on the obtained data, to optimize the performance of the radio access network based on the one or more parameters. The third network node then sends an indication of an outcome of the performed machine-implemented reinforcement learning procedure to the first network node operating in the communications network.

According to a third aspect of embodiments herein, the object is achieved by a first network node. The first network node is configured to handle the performance of the radio access network. The radio access network is configured to comprise the one or more radio network nodes. The first network node is configured to operate in the communications network. The first network node is further configured to determine the configuration of the one or more parameters in the radio access network. To determine is configured to be based on the one or more machine-implemented reinforcement learning procedures to optimize the performance of the radio access network based on the one or more parameters. The one or more machine-implemented reinforcement learning procedures are further configured to be based on at least one of: i) the one or more physical characteristics of the deployment of the radio access network, ii) the one or more radio characteristics of the radio access network, and iii) the location of users or traffic load in the radio access network. The first network node is further configured to initiate providing the one or more indicators of the determined configuration to the second network node configured to operate in the communications network.

According to a fourth aspect of embodiments herein, the object is achieved by a third network node. The third network node is configured to handle the performance of the radio access network. The radio access network is configured to comprise the one or more radio network nodes. The third network node is configured to operate in the communications network. The third network node is further configured to obtain the data configured to be collected from the respective subset of the radio network nodes. The respective subset is configured to cover the part of the deployment of the radio access network configured to have the first subset of at least one of: i) the one or more physical characteristics of the deployment of the radio access network, ii) the one or more radio characteristics of the radio access network, and iii) the location of users or the traffic load. The data indicates the one or more parameters in the radio access network. The third network node is also configured to perform the machine-implemented reinforcement learning procedure, based on the obtained data, to optimize the performance of the radio access network based on the one or more parameters. The third network node is further configured to send the indication of the outcome of the machine-implemented reinforcement learning procedure configured to be performed, to the first network node configured to operate in the communications network.

According to a fifth aspect of embodiments herein, the object is achieved by a computer program, comprising instructions which, when executed on at least one processor, cause the at least one processor to carry out the method performed by the first network node.

According to a sixth aspect of embodiments herein, the object is achieved by a computer-readable storage medium, having stored thereon the computer program, comprising instructions which, when executed on at least one processor, cause the at least one processor to carry out the method performed by the first network node.

According to a seventh aspect of embodiments herein, the object is achieved by a computer program, comprising instructions which, when executed on at least one processor, cause the at least one processor to carry out the method performed by the third network node.

According to an eighth aspect of embodiments herein, the object is achieved by a computer-readable storage medium, having stored thereon the computer program, comprising instructions which, when executed on at least one processor, cause the at least one processor to carry out the method performed by the third network node.

By the first network node determining the configuration, the first network node may choose or select a set of values in the one or more parameters, that may result in an enhanced performance of the radio access network. For example, in the case that the parameter is antenna tilt, the first network node, may choose a particular tilt degree for every antenna in the radio access network, based on the antenna location, per geographical region within the radio access network to enhance the throughput, with respect to a baseline value of the throughput.

BRIEF DESCRIPTION OF THE DRAWINGS

Examples of embodiments herein are described in more detail with reference to the accompanying drawings, and according to the following description.

DETAILED DESCRIPTION

Figure 1:
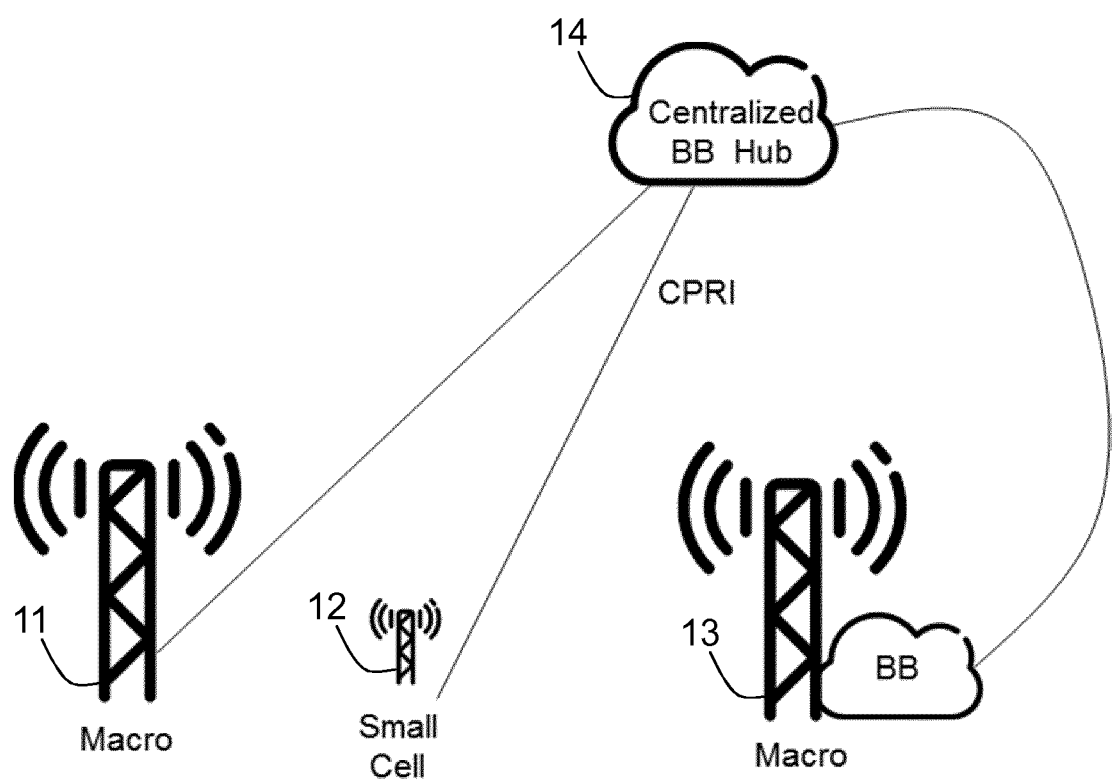
FIG. 1 is a schematic diagram depicting an example of a simplified C-RAN architecture.

As part of the development of embodiments herein, one or more problems with the existing technology will first be identified and discussed.

As mentioned earlier, 5G networks are complex and may have thousands of parameters to optimize. It will be impossible for a human operator to fully optimize the network for various traffic and map/building settings. RL with neural networks may be understood to empower an agent to cope with complex network status and policies. Despite recent RL success stories, there have been several challenges left in applying RL to the network planning and operation. First, a sophisticated radio network simulator may require a heavy computation, and thereby, the distributed training at a scale may need to be relied on for the success of RL in this use-case. Second, the algorithms for RL in intelligent network operation may need to be studied and investigated.

Certain aspects of the present disclosure and their embodiments may provide solutions to these or other challenges. Deep learning techniques, such as RL, have proven to be a promising technique for network planning and optimization. Embodiments herein may be understood to relate to network planning and optimization with reinforcement learning. In particular, embodiments herein relate to a system for optimizing RAN parameters using reinforcement learning, a branch of machine learning that may be understood to allow learning from actions based on impact of the action on the environment. It is to be noted that although tilt optimization is the key example parameter used to describe the methods in this document, the disclosed methods may alternatively or additionally be applied to other RAN parameters, e.g., transmit power, antenna azimuth etc.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

It should be noted that the embodiments and/or examples herein are not mutually exclusive. Components from one embodiment or example may be tacitly assumed to be present in another embodiment or example and it will be obvious to a person skilled in the art how those components may be used in the other exemplary embodiments and/or examples.

Figure 2:
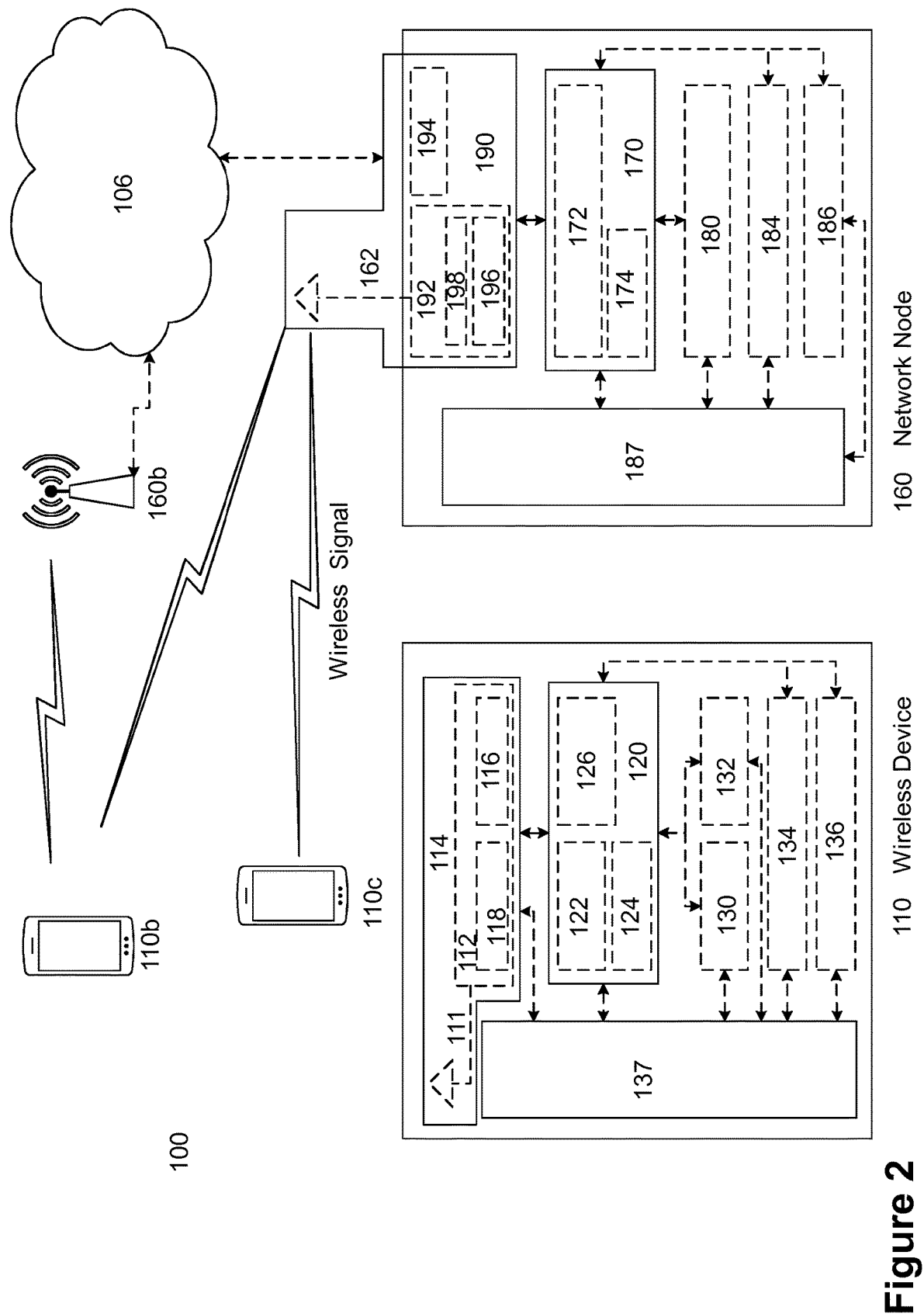
FIG. 2 is a schematic diagram depicting an example of a wireless network in accordance with some embodiments.

Although the subject matter described herein may be implemented in any appropriate type of system using any suitable components, the embodiments disclosed herein are described in relation to a wireless network 100, such as the example wireless network 100 illustrated in FIG. 2. For simplicity, the wireless network 100 of FIG. 2 only depicts network 106, network nodes 160 and 160b, and wireless devices (WDs) 110, 1010b, and 110c. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network 100 may provide communication and other types of services to one or more wireless devices to facilitate the wireless devices' access to and/or use of the services provided by, or via, the wireless network 100.

The wireless network 100 may comprise and/or interface with any type of communication, telecommunication, data, cellular, and/or radio network or other similar type of system. In some embodiments, the wireless network 100 may be configured to operate according to specific standards or other types of predefined rules or procedures. Thus, particular embodiments of the wireless network 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network 100 may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network 100 to enable and/or provide wireless access to the wireless device and/or to perform other functions (e.g., administration) in the wireless network 100. Examples of network nodes include, but are not limited to, access points (APs) (e.g., radio access points), base stations (BSs) (e.g., radio base stations, Node Bs, eNBs and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network 100 or to provide some service to a wireless device that has accessed the wireless network 100.

In FIG. 2, network node 160 includes processing circuitry 170, device readable medium 180, interface 190, auxiliary equipment 184, power source 186, power circuitry 187, and antenna 162. Although network node 160 illustrated in the example wireless network 100 of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple Random Access Memory (RAM) modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network 100 generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, WD 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD 110 may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network 100 generally.

Processing circuitry 120 may be configured to perform any determining, calculating, or similar operations (e.g., certain obtaining operations) described herein as being performed by a WD 110. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network 100, and allow them to benefit from the functionality described herein.

Auxiliary equipment 134 is operable to provide more specific functionality which may not be generally performed by WDs 110. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

As depicted in FIG. 2, the wireless network 100 may be understood to comprise a Radio Access Network (RAN), and the network 106. The radio access network may comprise a plurality of network nodes such as the network node 160 and the network node 160b. Each of the network node 160 and the network node 160b may be understood to be connectable to network 106 over a wired or wireless connection.

Figure 3:
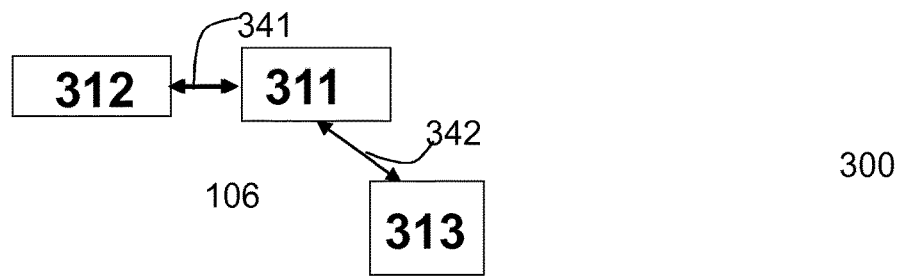
FIG. 3 is a schematic diagram illustrating two non-limiting examples, in panels a) and b), respectively, of a communications network, according to embodiments herein.
Figure 3:
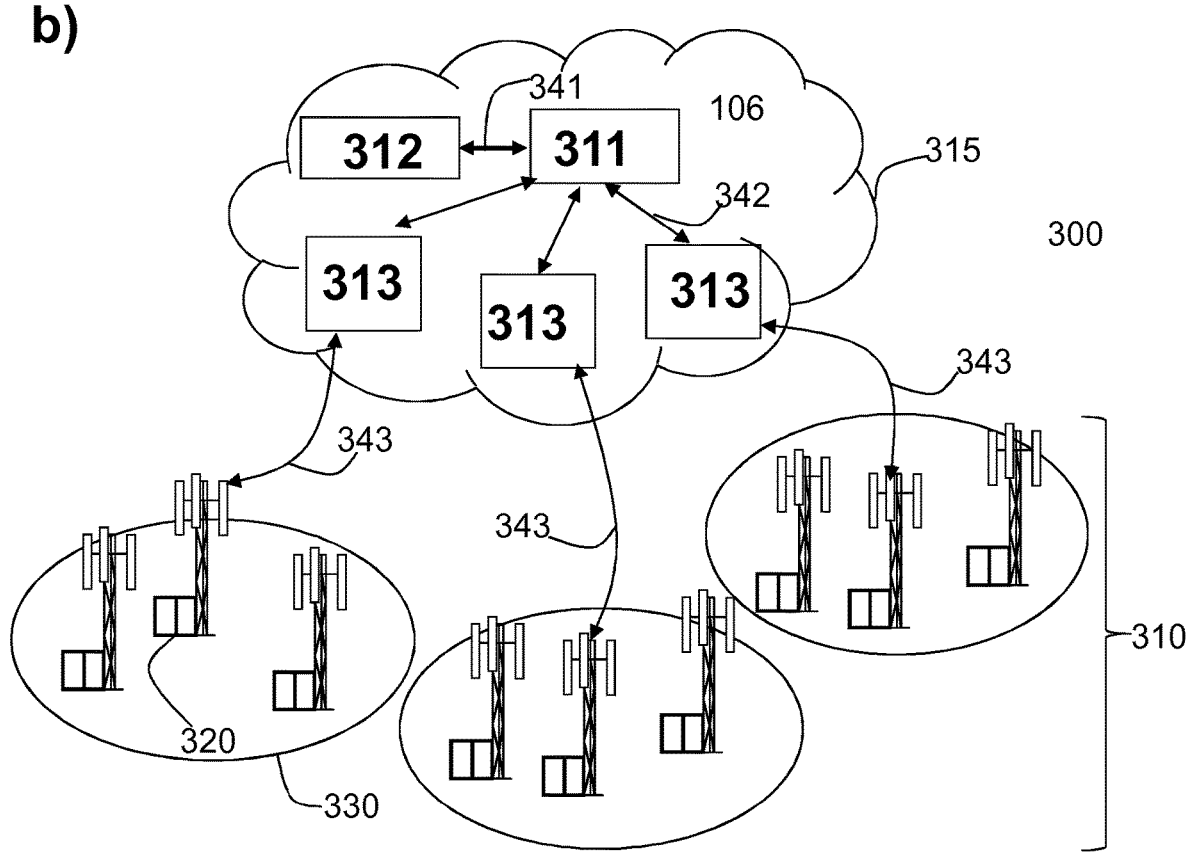

Any of the wireless network 100 or the network 106 may be referred to herein as a "communications network". FIG. 3 depicts two non-limiting examples of such a communications network 300. The non-limiting example of panel a) in FIG. 3, depicts the communications network 300 as an example of the network 106 described in FIG. 2. The non-limiting example of panel b) in FIG. 3, depicts the communications network 300 as an example of the wireless network 100 described in FIG. 2, wherein the communications network 300 comprises the network 106 and a radio access network 310.

The communications network 300 comprises a plurality of network nodes, whereof a first network node 311, a second network node 312, and one or more third network node 313 are depicted in the non-limiting examples of FIG. 3. In the particular examples depicted in FIG. 3, any of the first network node 311, the second network node 312, and the one or more third network nodes 313 may be a core network node in the network 106, e.g., a centralized BB Hub.

Each of the first network node 311, the second network node 312, and the one or more third network nodes 313 may be understood as a first computer system, a second computer system, and one or more third computer systems. Each of the first network node 311, the second network node 312, and the one or more third network nodes 313 may be implemented as a standalone server in e.g., a host computer in the cloud 315. In LTE and in 5G, for example, any of the first network node 311, the second network node 312, and the one or more third network nodes 313 may be located in the OSS (Operations Support Systems). In other examples, any of the first network node 311, the second network node 312, and the one or more third network nodes 313 may be a distributed node, such as a virtual node in the cloud 315, and may perform its functions entirely on the cloud 315, or partially, in collaboration or collocated with a radio network node.

The second network node 312 may be a computer system, which may be located outside of the network 106 of the communications network 300, but which may be able to communicate with it through a wireless or wired connection. The second network node 312 may be another core network node, or, in some examples not depicted in FIG. 3, a radio network node, such as any of the one or more radio network nodes 320 described below, e.g., such any of the network node 160 or the network node 160b described in FIG. 2.

In some examples of the communications network 300, which are not depicted in FIG. 3, any of the first network node 311, the second network node 312, and the one or more third network nodes 313 may be co-located, or be a same node. In some examples, all of the first network node 311, the second network node 312, and the one or more third network nodes 313 may be co-localized, or be the same node.

The communications network 300 may also comprise one or more radio network nodes 320, such as any of the network node 160 and the network node 160b described in FIG. 2. Each of the one or more radio network nodes 320 may be understood as a transmission point such as a radio base station, for example a gNB, an eNB, or any other network node with similar features capable of serving a wireless device, such as a user equipment or a machine type communication device, in the communications network 300. Any of the one or more radio network nodes 320 may, in some examples, serve receiving nodes, such as wireless devices, with serving beams.

In the example of FIG. 3, panel b), the communications network 300 covers a geographical area which may be divided into cell areas, wherein each cell area may be served by a radio network node, although, one radio network node may serve one or several cells. In the non-limiting example depicted in FIG. 3, panel b), the cells are not depicted to simplify the Figure.

The communications network in the example of FIG. 3, panel b), comprises nine radio network nodes 320. However, it may be understood that the number of second network nodes depicted in panel b) is for illustration purposes only. It may be understood that any description provided herein for the second network node 320 may equally apply to any of the other second network nodes.

The one or more third network nodes 313, in the non-limiting example of FIG. 3, panel b), comprise three third network nodes. However, the number of one or more third network nodes 313 depicted in panel b) is for illustration purposes only. It may be understood that the one or more third network nodes 313 may comprise any number of third network nodes.

Each of the one or more third network nodes 313 may be understood to have a respective subset 330 of the radio network nodes 320 in the radio access network 310. In the non-limiting example of FIG. 3, panel b), each of the third network nodes 313 has a respective subset 330 of three radio network nodes 320, although the number of radio network nodes 320 in each respective subset 330 may be understood to be for illustration purposes only. Expressed differently, each respective subset 330 of the radio network nodes 320 may have a respective agent.

In some examples, any of the one or more third network nodes 313 may be understood to be co-localized, or be the same node as one of the radio network nodes 320 in its respective subset 330.

A plurality of wireless devices such as the WD 110 may be located in the communication network 300 in the example of FIG. 3, panel b). This is not depicted in FIG. 3, panel b) to simplify the Figure.

The first network node 311 may be configured to communicate within the communications network 100 with the second network node 132 over a first link 341. The first network node 311 may be configured to communicate within the communications network 100 with each respective third network node of the one or more third network node 313 over a respective second link 142. Each of the one or more third network nodes 313 may be configured to communicate within the communications network 100 with each of the radio network nodes 320 in the respective subset 330 of the radio network nodes 320 over a respective third link 343.

Any of the links just mentioned may be, e.g., a radio link, a wired link or an X2 interface.

In general, the usage of "first", "second", and/or "third", herein may be understood to be an arbitrary way to denote different elements or entities, and may be understood to not confer a cumulative or chronological character to the nouns they modify.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 4:
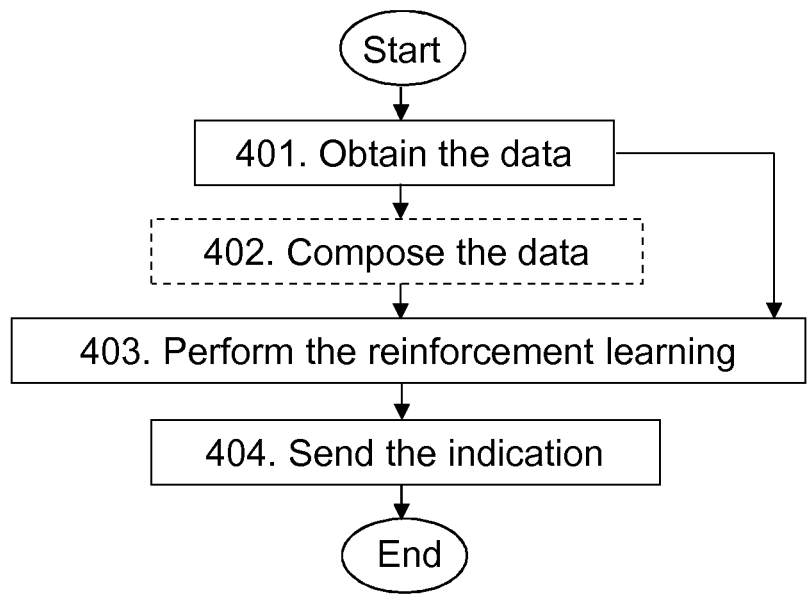
FIG. 4 is a flowchart depicting a method in a third network node, according to embodiments herein.

Embodiments of a method, performed by a third network node 313 of the one or more third network nodes 313, will now be described with reference to the flowchart depicted in FIG. 4. The method may be understood to be for handling a performance of the radio access network 310 comprising the one or more radio network nodes 320. The third network node 313 operates in the communications network 300.

In some embodiments all the actions may be performed. In some embodiments, some actions may be performed. In FIG. 4, the optional action is indicated with dashed lines. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

The actions described herein as being performed by the third network node 313 may be understood to equally apply to any of the one or more third network nodes 313.

Action 401

In this Action 401, the third network node 313 obtains data collected from a respective subset 330 of the radio network nodes 320. The respective subset 330 covers a part of a deployment of the radio access network 310. A part of the deployment may be understood as a geographical area within the deployment, or a group of elements, e.g., entities, within the deployment. The part of the deployment of the radio access network 310 has a first subset of at least one of: i) one or more physical characteristics of the deployment of the radio access network 310, ii) one or more radio characteristics of the radio access network 310, and iii) a location of users or traffic load. The data indicates one or more parameters in the radio access network 310.

Obtaining may be understood as, e.g., receiving, e.g., via the respective third link 343.

A parameter may be understood as any network parameter, e.g., a variable, that may be adjusted to enhance the behaviour of the radio access network 310. In some embodiments, at least one of the one or more parameters may be antenna tilt, which was described in the Background section. While the main example parameter covered in this document is antenna tilt, there are many other parameters such as transmit power, antenna azimuth, etc., that may use the same system to be optimized. According to this, the data obtained in this Action 401 may indicate, for example, tilt degree e.g., an "Electrical Downtilt Degree", and location of N antennas, e.g, a "GPS coordinate of eNB site", user location in space, and respective throughput of the users.

The obtained data may comprise at least one of: a) simulated data and b) real data. In some examples, the third network node 313 may obtain real data via a component in a DU or the cloud that may probe the network key performance indicators (KPI), e.g., RSSI, throughput, for a given time, e.g., every 3 minutes.

The one or more physical characteristics of the deployment of the radio access network 310 may be, for example a map of the city and buildings in the region of interest, multiple geographical segments of the deployment of the radio access network 310, e.g., grid, hexagon, etc., building structure information of the corresponding geographical segment, and/or the sites where an antenna is deployed.

The one or more radio characteristics of the radio access network 310 may be, for example, the frequency bands in which each antenna may operate.

The location of users may be, for example, a cell ID or a set of GPS coordinates for every user, or coarse-grained location information attained by any localization technique. The traffic may be, for example, network traffic density.

Action 402

In this Action 402, the third network node 313 may compose the obtained data into the at least one of the following structures a), b) and c). According to option a), the data may be structured in one or more two dimensional matrices. Each of the two dimensional (2D) matrices may comprise information regarding the one of one or more parameters in the radio access network 310, and one of: i) one of the one or more physical characteristics of the deployment, ii) one of the one or more radio characteristics of the radio access network 310, and iii) the location of users or the traffic load in the radio access network 310. Information may be understood as one or more parts, e.g., values, of the obtained data.

According to option b), the data may be structured in one or more three dimensional matrices. Each of the three dimensional (3D) matrices may comprise information regarding one of the one or more parameters and one of: i) two or more of the one or more physical characteristics of the deployment, ii) two of the one or more radio characteristics of the radio access network 310, and iii) the location of users or the traffic load in the radio access network 310.

According to option c), the data may be structured in one or more four dimensional matrices. Each of the four dimensional (4D) matrices may be based on a combination of one or more of: i) the one or more two dimensional matrices and ii) the one or more three dimensional matrices.

In some embodiments, each matrix may correspond to a particular geographical segment of the deployment.

In some examples, the third network node 313 may be a component in a DU or the cloud that may gather and organize the obtained or probed information into multiple 3D matrices that may be fed into the third network node 313, or RL agent, for the next action 403, e.g., 3D: x, y coordinates and KPI value. It may be saved in a 2D matrix as well. For example, first, the third network node 313 may split the area of deployment of the radio access network 310 into multiple geographical segments, e.g., grid, hexagon, etc., and map subscribers into the corresponding geographical segment, using their localization information, e.g., cell ID. Second, the third network node 313 may build a 3D matrix per KPI where each element of a matrix may be the representative KPI value of the corresponding geographical segment. Third, the third network node 313 may build a 3D matrix with a same dimension, where each element may indicate the building structure information of the corresponding geographical segment. Fourth, the third network node 313 may build a 3D matrix with a same dimension where each element may indicate the configuration of antenna that may be located in the corresponding geographical segment. In some examples of embodiments herein, those collected 3D matrices may be combined into a 4D matrix as an input to the agent, that is, the third network node 313.

By composing the obtained data into at least one of the structures just described, in this Action 402, the third network node 313 is enabled to perform a machine-implemented reinforcement learning procedure in the next Action 403, with enhanced efficiency. More precisely, by building such structured 2D or 3D matrices, and feeding them to the neural network model in the third network node 313, e.g., the RL agent, the training of the model may be more feasible and stable. Also, it may enable to use the existing neural network structures that were already validated in machine learning applications.

Action 403

In this Action 403, the third network node 313 performs a machine-implemented reinforcement learning procedure, based on the obtained data, to optimize the performance of the radio access network 310 based on the one or more parameters.

The third network node 313, as any of the one or more third network nodes 313 may therefore be understood as an agent.

To optimize the performance of the radio access network 310, as used herein, may be understood to refer to any, or both, of the following two different aspects or stages of the performance: a) network planning, and b) optimization of network operation. Network planning may be understood to be usually done at the beginning, before deploying the radio access network 310. It may be understood to encompass decisions on where to deploy the one or more radio network nodes 320, how to connect them, how much bandwidth to provision at/between nodes, and how to configure parameters that are usually not configurable on the fly from network control systems, such as tilt, in most of today's networks. Network planning may be understood as a problem space for both fixed and mobile networks. Optimization of network operation may be understood to concern parameters that may be modified during the operation of the radio access network 310. This may also be understood as a problem space in both fixed and mobile networks.

To perform the machine-implemented reinforcement learning procedure in this Action 403, various RL algorithms may be used, such as, e.g., Asynchronous Advantage Actor Critic (A3C), described in https://arxiv.org/abs/1602.01783, Evolutionary Strategy (ES), described in https://en.wikipedia.org/wiki/Evolution_strategy, and Proximal Policy Optimization (PPO), described in https://blog.openai.com/openai-baselines-ppo, Sequential Least Squares Programming (SLSQP), Broyden-Fletcher-Goldfarb-Shanno (BFGS), and/or Newton.

In some embodiments, the machine-implemented reinforcement learning procedure may be performed in this Action 403, further based on the composed data, that is, on the obtained data, composed as described in Action 402.

Phases of the Machine-Implemented Reinforcement Learning Procedure

The machine-implemented reinforcement learning procedure may comprise a first training phase, or Phase 1, and a second training phase, or Phase 2. The first training phase may use a simulator environment, and may generate a first set of simulated data. The second training phase may be based on a result of the first training phase. The second training phase may use a real world environment, and may generate a second set of real data. Thus, the data may comprise at least one of: a) simulated data and b) real data.

Phase 1: Training Phase Using Simulator Environment

Figure 5:
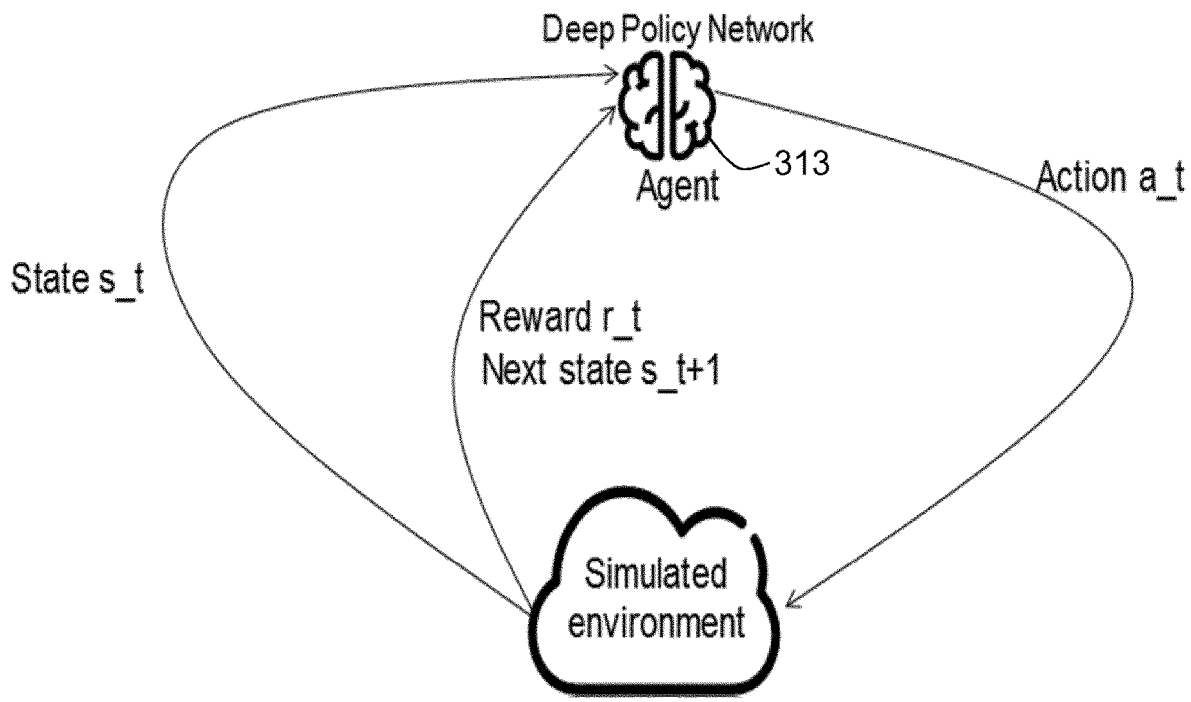
FIG. 5 is a schematic diagram depicting an example of the initial training phase of a method in a third network node, according to embodiments herein.

In the first or initial training phase, the third network node 313 may use a simulator. The use of a simulator may be needed to avoid an initial configuration that may be too far off from the environment needs, which may perturb user experience. FIG. 5 is a schematic diagram depicting the first or initial training phase. FIG. 5 shows the initial phase where the RL model is trained using a simulator. For example, the simulator may take as input: a map of the city and buildings in the region of interest, the sites where an antenna is deployed, the frequency bands in which each antenna can operate, or network traffic density.

The output form an agent such as any of the one or more third network nodes 313 may be: a) a probability distribution of discrete actions, e.g., increase/decrease of the parameters by a fixed amount, b) termination of the episode, wherein an episode may be understood as a sequence of state and action, until reaching a 'termination condition'; one of those termination conditions may be when 'action' becomes 'termination of the episode', c) discrete parameters, etc., and/or d) a continuous value of configuration parameters, e.g., the amount of variation of the parameters, parameter values, etc. A configuration parameter may be, e.g., a configuration parameter of the antenna which may affect the network performance.

The simulator may then return as output for a given configuration, e.g., antenna tilt: average user throughput, average Received Signal Strength Indicator (RSSI), etc.

A Deep Policy Network may be understood as a neural network which outputs a probability distribution of actions. As depicted in FIG. 5, the third network node 313 may interact with the simulated environment in discrete time steps t. At each time step t, the simulated environment is in a state ($s_t$) and sends an observation of this state, along with the current reward r ($r_t$) to the third network node 313. Then, the third network node 313 may choose any action ($a_t$) that may be available in that state. Then, the simulated environment may respond at the next time step (t+1) by moving into a new state ($s_{t+1}$), and giving the third network node 313 a corresponding reward.

Iterating over this process and observing the rewards, the third network node 313 may learn optimal policies that establish a correspondence between states and actions in such a way that the cumulative reward of the actions may get maximized.

The optimization objective of the Markov Decision Process (MDP), which is one of the models of RL that may be used, may be selected depending on operator policy. For example, throughput may be a valid objective for the simulation phase. In case of network planning, the objective may be to optimize overall throughput at termination of the simulation. For adaptive optimization, the throughput may be optimized for the sum of throughput over time.

Any of the data used or output by the third network node 313 in the first training phase may be referred to herein as the first set of simulated data.

Phase 2: Real World Environment

Figure 6:
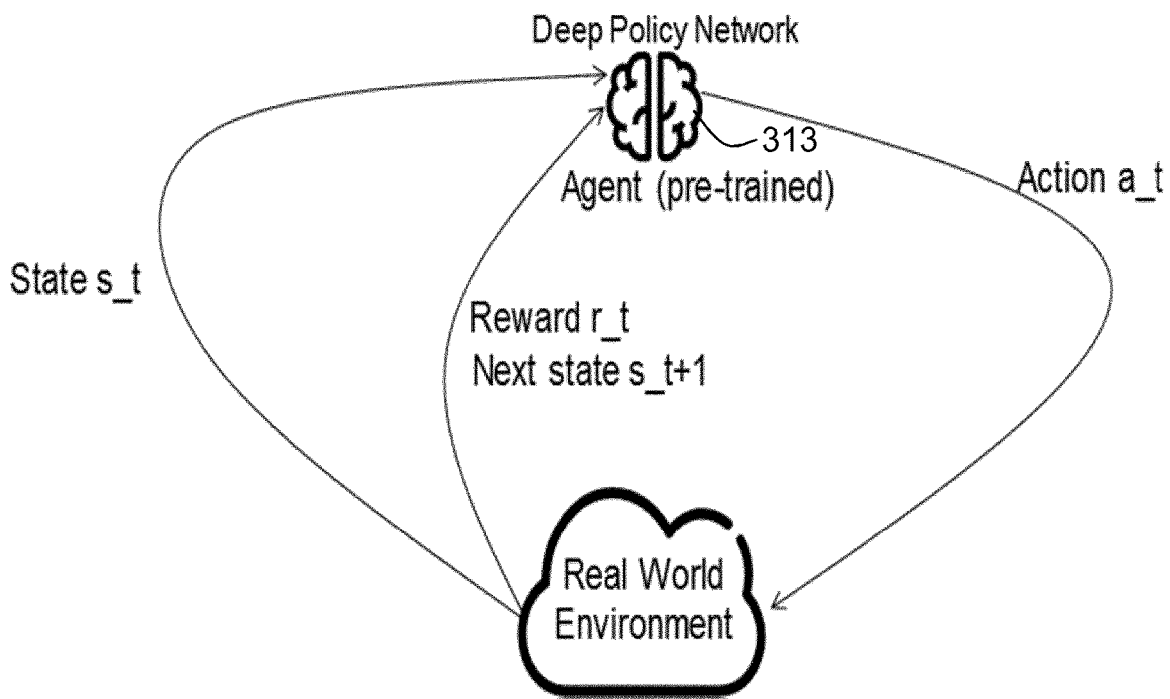
FIG. 6 is a schematic diagram depicting an example of a continued training in the real world environment of a method in a third network node, according to embodiments herein.

In the second training phase, the third network node 313 may use a real world environment. Once the agent, e.g., the third network node 313, as any of the one or more third network nodes 313, is trained on the simulated environment, the agent may be used in the real world scenario. FIG. 6 is a schematic diagram depicting continued training in a real world environment, according to the second training phase. As stated earlier, the second training phase may be based on the result of the first training phase. This may be understood to mean that the second training phase may use as input an output of the first training phase, which may be an initial configuration that may closer to the needs the environment of the radio access network 310 may have. This may be understood as pre-training the third network node 313, and to simplify the RL procedure. FIG. 6 depicts the pre-trained agent and interaction with the real world environment. The description of the different elements depicted in FIG. 6 corresponds to that provided in relation to FIG. 5.

In case of real world deployment, Received Signal Strength Indicator (RSSI) may be a more valid objective function to optimize. It may be noted that for simplicity, this document primarily refers to throughput.

Needed components in a real world deployment may include any of the following components. In a first example, the component in a DU or the cloud that may probe the network key performance indicators (KPI), e.g., RSSI, throughput, for a given time, e.g., every 3 minutes, in accordance with Action 401. In a second example, the component in a DU or the cloud that, in accordance with Action 402, may gather and organize the probed information into multiple 3D matrices that may be fed into the RL agent for the next action, e.g., 3D: x, y coordinates and KPI value. The probed information may be saved in a 2D matrix as well. In a third example, a component in a DU or the cloud that may compute, according to some examples of this Action 403, the reward by using the probed information. In a fourth example, an agent in a DU or the cloud that may receive the observed 4D matrix, reward and may then, according to some examples this Action 403, output the action, while training itself, e.g., adjusting deep neural network (DNN) weights. In a fifth example, a component in a DU that may perform, according to some examples of this Action 403, the action output from the agent, in form of a signals, e.g., DC voltage, to tilt the antenna.

Any of the data used or output by the third network node 313 in the second training phase may be referred to herein as a second set of simulated data.

According to the foregoing, the machine-implemented reinforcement learning procedure may be further based on, e.g., use, at least one of: a) the first set of simulated data obtained in the first training phase of the machine-implemented reinforcement learning procedure, and b) the second set of real data obtained in the second training phase of the machine-implemented reinforcement learning procedure. The second training phase may be based on a result of the first training phase.

By performing the machine-implemented reinforcement learning procedure in this Action 403 based on the obtained data, the third network node 313 may enable to optimize the performance of the radio access network 310 based on the one or more parameters. This document mentions the use of the proposed method for both network planning and later network optimization/tuning. In case of network planning, the use of the simulator may be enough. However, an operator of the communications network 300 may still choose to optimize further certain parameters on the live network. In the case of network optimization, after the planning phase, the operator may still use the simulator as a digital twin of the real world environment to test various actions. When confident based on the simulator's results, the operator may have the agent run the action in the actual environment. In some embodiments, the actual outcome of the environment may be fed back to improve the simulator's accuracy.

Action 404

In this Action 404, the third network node 313 sends an indication of an outcome of the performed machine-implemented reinforcement learning procedure to the first network node 311 operating in the communications network 300.

The sending in this Action 404 may be implemented, for example, via the respective second link 342, e.g., a wired link or a radio link.

The indication may be, e.g., a message comprising one or more indicators of: the probability distribution of discrete options, e.g., increase/decrease of the parameters by a fixed amount, termination of the episode, discrete parameters, etc., and/or the continuous value of configuration parameters, e.g., the amount of variation of the parameters, parameter values, etc. For a given configuration, e.g., antenna tilt, the indication may indicate: average user throughput, average Received Signal Strength Indicator (RSSI), etc.

By sending the indication to the first network node 311 in this Action 404, the third network node 313 may enable the first network node 311 to optimize the performance of the radio access network 310 based on the one or more parameters. The first network node 311 may gather similar indications, that is, respective indications, from, respectively, the other one or more third network nodes 313 in the communications network 300, and be therefore enabled to optimize the performance, e.g., network planning and/or optimization of network operation, of the radio access network 310, with higher confidence.

Figure 7:
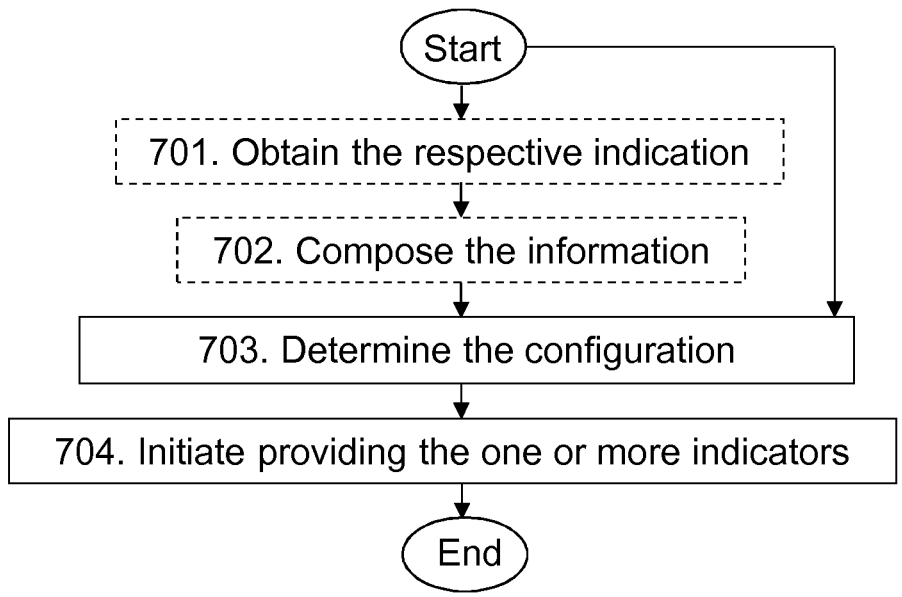
FIG. 7 is a flowchart depicting a method in a first network node, according to embodiments herein.

Embodiments of a method, performed by the first network node 311, will now be described with reference to the flowchart depicted in FIG. 7. The method may be understood to be for handling the performance of the radio access network 310 comprising the one or more radio network nodes 320. The first network node 311 operates in the wireless communication network 100.

In some embodiments all the actions may be performed. In some embodiments, three or more actions may be performed. In FIG. 7, optional actions are indicated with dashed lines. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

The detailed description of some of the following corresponds to the same references provided above, in relation to the actions described for the third network node 313, and will thus not be repeated here to simplify the description, however, it applies equally. For example, one of the one or more parameters may be e.g., antenna tilt.

Action 701

In this Action 701, the first network node 311 may obtain, respectively, from each of the one or more third network nodes 313 operating in the communications network 300, a respective indication. The respective indication is of a respective outcome of a respective machine-implemented reinforcement learning procedure of one or more machine-implemented reinforcement learning procedures. Each of the respective machine-implemented reinforcement learning procedures is based on respective data collected from a respective subset 330 of the one or more radio network nodes 320. Each respective subset 330 covers different parts of the deployment.

As stated earlier, a part of the deployment may be understood as a geographical area within the deployment, or a group of elements, e.g., entities, within the deployment.

Obtaining may be understood as, e.g., receiving, e.g., via the respective third link 343.

The one or more machine-implemented reinforcement learning procedures may be based on data, as described earlier. Here, the data may be respectively collected from each of the respective subsets 330 of the radio network nodes 320. The data may comprise at least one of: a) the simulated data and b) the real data. This is because any of the respective one or more machine-implemented reinforcement learning procedures may comprise the first training phase, and the second training phase. The first training phase may use the simulator environment, and may generate a first set of simulated data, in each of the one or more third network nodes 313. The second training phase may be based on a result of the first training phase. The second training phase may use a real world environment, and may generate the second set of real data, in each of the one or more third network nodes 313.

As explained earlier, the data may be structured in at least one of the following options a), b) and c). According to option a), the data may be structured in one or more two dimensional matrices. Each of the two dimensional matrices may comprise information regarding one of the one or more parameters in the radio access network 310, and one of: i) one of the one or more physical characteristics of the deployment, ii) one of the one or more radio characteristics of the radio access network 310, and iii) a location of users or traffic load in the radio access network 310.

According to option b), the data may be structured in one or more three dimensional matrices. Each of the three dimensional matrices may comprise information regarding one of the one or more parameters and one of: i) two or more of the one or more physical characteristics of the deployment, ii) two of the one or more radio characteristics of the radio access network 310, and iii) the location of users or traffic load in the radio access network 310.

According to option c), the data may be structured in one or more four dimensional matrices. Each of the four dimensional matrices may be based on a combination of one or more of: i) the one or more two dimensional matrices and ii) the one or more three dimensional matrices.

In some embodiments, each matrix may correspond to a particular geographical segment of the deployment.

In some embodiments, at least one of the one or more parameters may be antenna tilt.

By performing the determining in this Action 701, the first network node 311 may be enabled to determine a configuration of the one or more parameters in the radio access network 310 such that the performance of the radio access network 310 is optimized.

Action 702

While in some embodiments, as part of Action 701, the first network node 311 may obtain the data composed in one of the structures described in the previous Action 701, in other embodiments, the first network node 311 may optionally compose the information into the named structures itself. Accordingly, in this Action 702, the first network node 311 composes the information into the at least one of a) the one or more two dimensional matrices, b) the one or more three dimensional matrices, and c) the one or more four dimensional matrices, similarly to how it has been described earlier for the third network node 313 in Action 402.

Action 703

In this Action 703, the first network node 311 may determine a configuration of the one or more parameters in the radio access network 310. The determining in this Action 703 is based on one or more machine-implemented reinforcement learning procedures to optimize the performance of the radio access network 310 based on the one or more parameters. The one or more machine-implemented reinforcement learning procedures are further based on at least one of: i) the one or more physical characteristics of the deployment of the radio access network 310, ii) the one or more radio characteristics of the radio access network 310, and iii) the location of users or traffic load in the radio access network 310.

Determining may be understood as e.g., deriving, calculating.

The one or more machine-implemented reinforcement learning procedures may be understood to be performed as described earlier. In some embodiments, the first network node 311 may perform the one or more machine-implemented reinforcement learning procedures itself. In other embodiments wherein Action 701 may be performed, the determining 703 may be based on the obtained one or more respective indications. That is, the one or more machine-implemented reinforcement learning procedures may be performed by each of the one or more third network nodes 313, and the first network node 311 may then determine the configuration based on the one or more respective indications, obtained respectively from each of the one or more third network nodes 313.

In some embodiments, the determining in this Action 703 may be based on at least one of: a) the first set of simulated data obtained in a first training phase of the one or more machine-implemented reinforcement learning procedures, and b) the second set of real data obtained in a second training phase of the one or more machine-implemented reinforcement learning procedures, wherein the second training phase may be based on a result of the first training phase. In some embodiments, this may be understood to mean that the determining in this Action 703 may be based on at least one of: a) a respective first set of simulated data for each of the one or more third network nodes 313, and b) a respective second set of simulated data for each of the one or more third network nodes 313.

In this Action 703, the first network node 311 may be understood, by determining the configuration, to choose or select a set of values in the one or more parameters, that may result in an enhanced performance of the radio access network 310. For example, in the case that the parameter is antenna tilt, the first network node 311 may choose a particular tilt degree for every antenna in the radio access network 310, based on the antenna location, per geographical region within the radio access network 310 to enhance the throughput, with respect to a baseline value of the throughput.

Action 704

In this Action 704, the first network node 311 initiates providing one or more indicators of the determined configuration to the second network node 312 operating in the communications network 300.

Initiating may be understood as e.g., triggering, starting, or enabling.

In the examples wherein the first network node 311 may provide the one or more indicators itself, the providing may be implemented via, e.g., the first link 341. An indicator may be e.g., a message instructing one of the one or more radio network nodes 320 to tilt its antennas in the particular tilt degrees determined by the determined configuration.

In some examples wherein the second network node 312 may be a core network node, the indicator may be, e.g., a recommended initial configuration for a new deployment in a particular geographical area in the communications network 300.

By initiates providing the one or more indicators in this Action 704, the first network node 311 enables the improvement in the performance of the radio access network 310 to be executed.

The RL Policy Network

Figure 8:
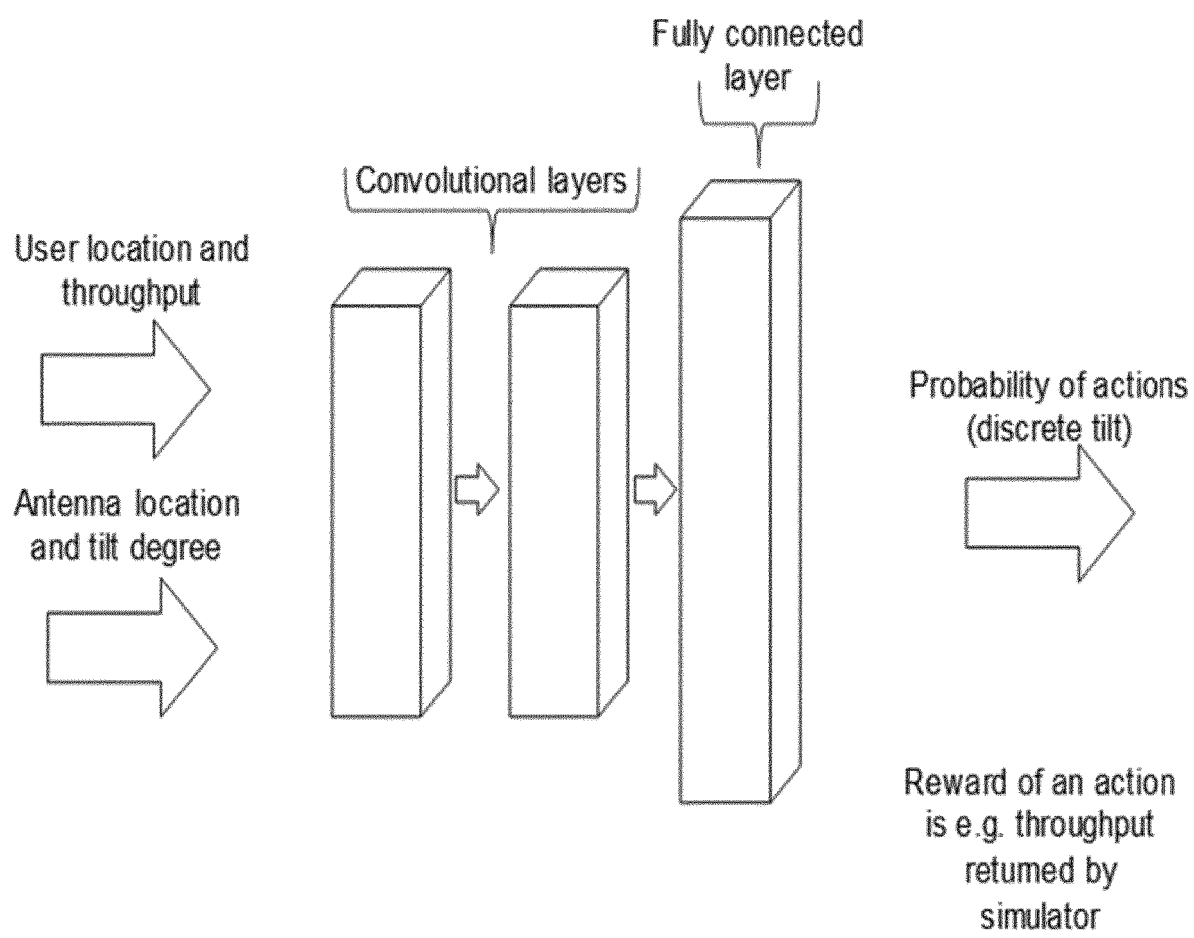
FIG. 8 is a schematic diagram depicting an example of an RL policy network, according to embodiments herein.

FIG. 8 is a schematic diagram illustrating the agent's policy network, e.g., the policy network of the third network node 313. This is a non-limiting example implementation and other RL algorithms are possible. As illustrated in FIG. 8, the third network node 313 obtains data collected from the respective subset 330 of the radio network nodes 320 having the one or more physical characteristics of the deployment of the radio access network 310, in this example, antenna location and tilt degree and the location of users and traffic load, in this example, user location and throughput. The performing in Action 403 of the machine-implemented reinforcement learning procedure comprises processing the obtained data via a series of convolutional layers, and then, through a fully connected layer. The indication of outcome of the performed machine-implemented reinforcement learning procedure is a probability of actions, that is, of discrete tilt changes. The reward of an action used for the performing of the machine-implemented reinforcement learning procedure is e.g., the throughput returned by the simulator.

Implementation and Results

Figure 9:
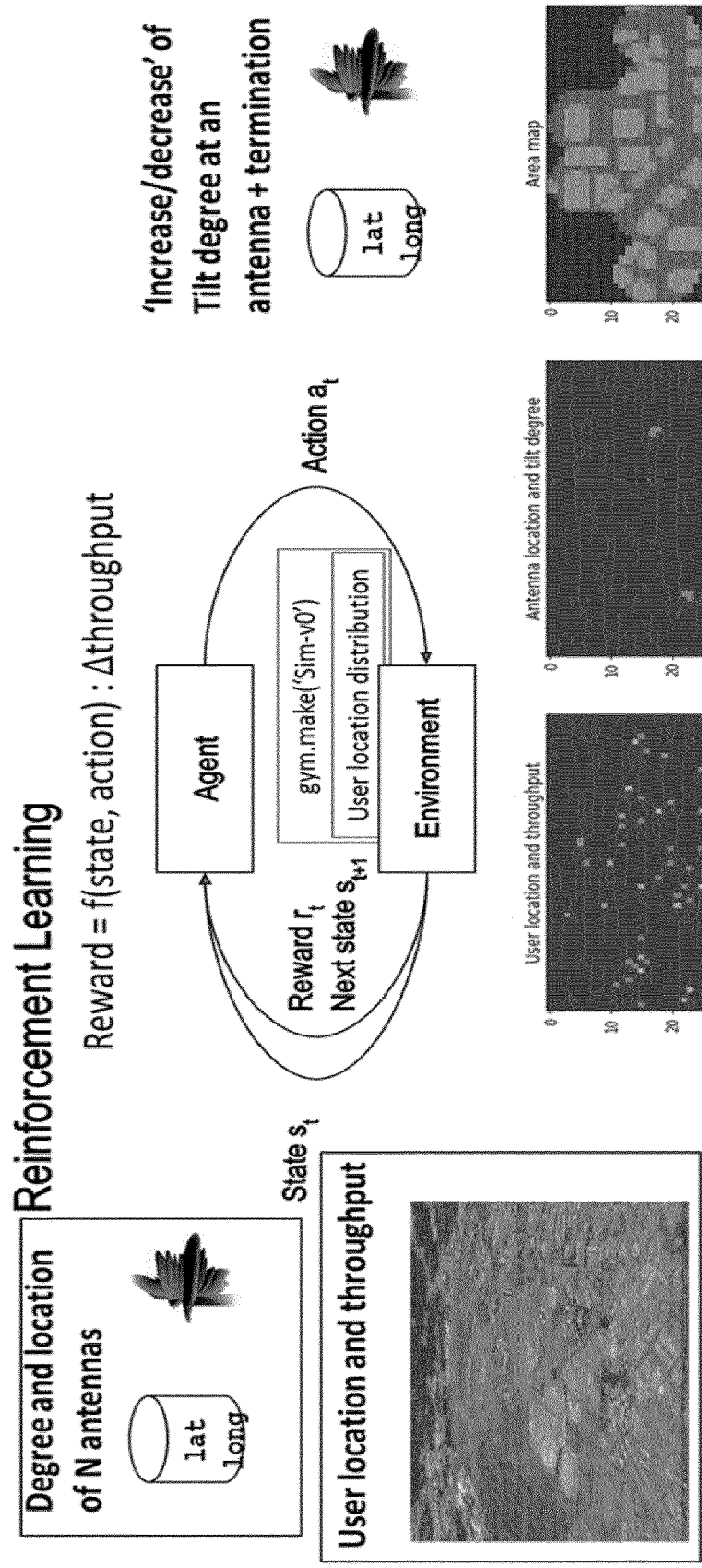
FIG. 9 is a schematic diagram depicting an example of RL agent antenna tilt planning, optimizing/adapting for hot zones, according to embodiments herein.

In FIG. 9 an overall view of embodiments herein is depicted as a schematic diagram. Gym (https://gym.openai.com/docs) toolkit may be used to integrate the simulation environment for the RL training. As illustrated in this non-limiting example, the MDP objective is to maximize overall throughput at termination of the simulation, where the reward, here, a change in throughput, is a function of the state, e.g., user/antenna distribution, and action, increase or decrease of antenna tilt degree. As indicated in FIG. 9, each episode starts with different and random user distribution. The third network node 313 obtains data collected from the respective subset 330 of the radio network nodes 320 having the one or more physical characteristics of the deployment of the radio access network 310, in this example, antenna location and tilt degree and the location of users and traffic load, in this example, user location and throughput. The reward used for the performing of the machine-implemented reinforcement learning procedure is, in this example, the throughput returned by the simulator. The reward is a function of a state and an action, which leads to a change in throughput. In every iteration of the procedure, a new action is taken, here, an increase or decrease of the tilt degree, in latitude and longitude, at an antenna of the N antennas, and a termination. The three images at bottom right in FIG. 9 illustrate a heat map, with the legend to the further right, of an example state, where the horizontal and vertical axis are, respectively, x,y geographical coordinates, and each pixel corresponds to each grid in a given area. In the image to the further left image, the intensity of the pixels indicates the throughput of users in the corresponding grid area. In the middle image, the color of the pixels indicates tilt degree of the antenna if the antenna is located in that grid, and otherwise set to a greyscale shade corresponding to blue. The right image is a building map, where the building structure of each grid is coded into the color of the corresponding pixels.

Preliminary Results

Figure 10:
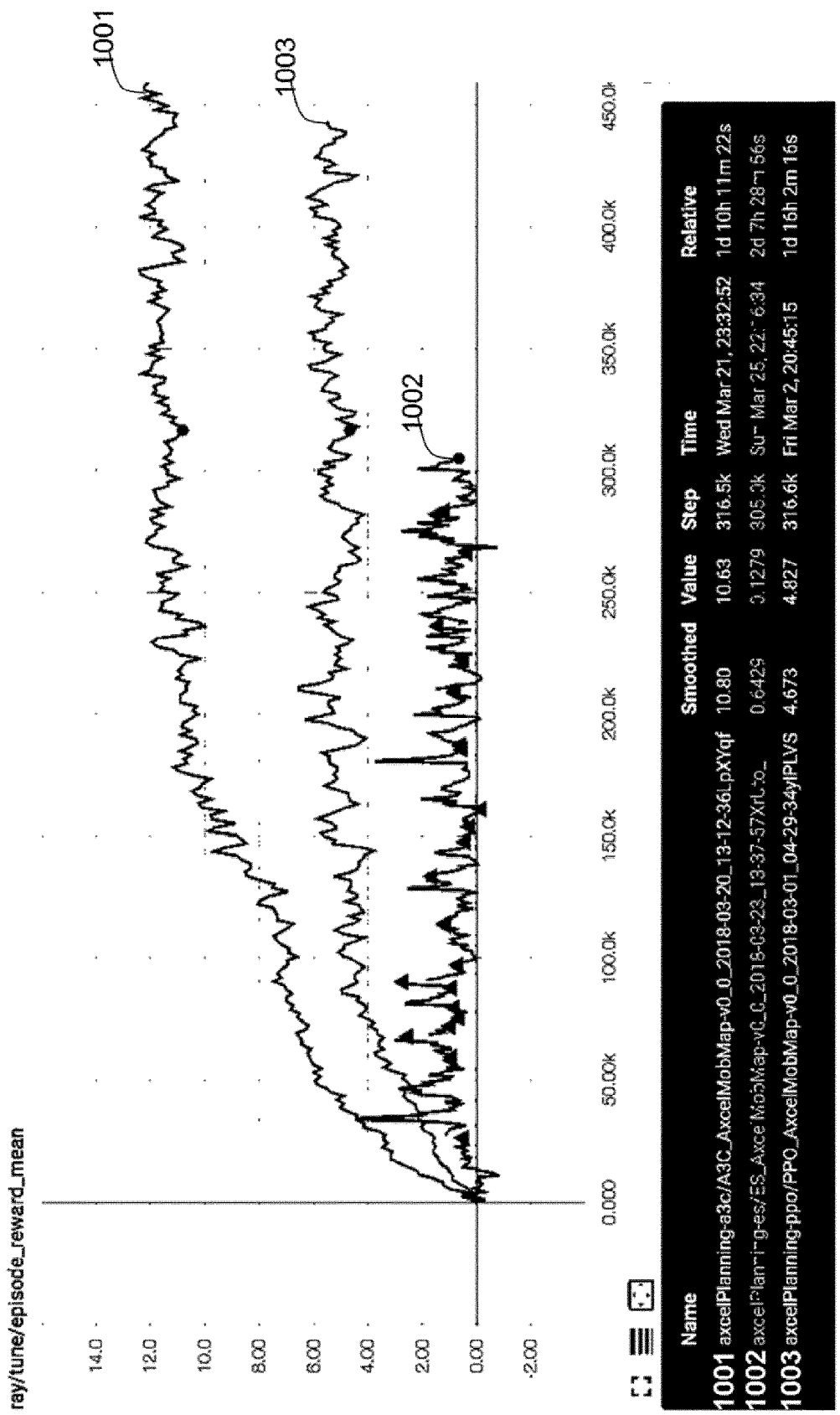
FIG. 10 is a schematic diagram depicting an example of a training performance using Ray execution environment, according to embodiments herein.

FIG. 10 is a graphical representation showing the training time for various RL algorithms, as used in Action 403, according to embodiments herein. In particular, FIG. 10 depicts an example of training performance using a Ray execution environment, as described in https://rise.cs-.berkeley.edu/projects/ray. The X axis is the number of simulations. The Y axis is the mean reward, where higher is better. The RL algorithms are Asynchronous Advantage Actor Critic (A3C) 1001, https://arxiv.org/abs/1602.01783, Evolutionary Strategy (ES) 1002, https://en.wikipedia.org/wiki/Evolution_strategy, and Proximal Policy Optimization (PPO) 1003, https://blog.openai.com/openai-baselines-ppo. As depicted in the FIG. 10. For every algorithm, "smoothed", "value", "Step", "Time", and "Relative" are used as described in https://ray.readthedocsio/en/latest/rllib.html.

Figure 11:
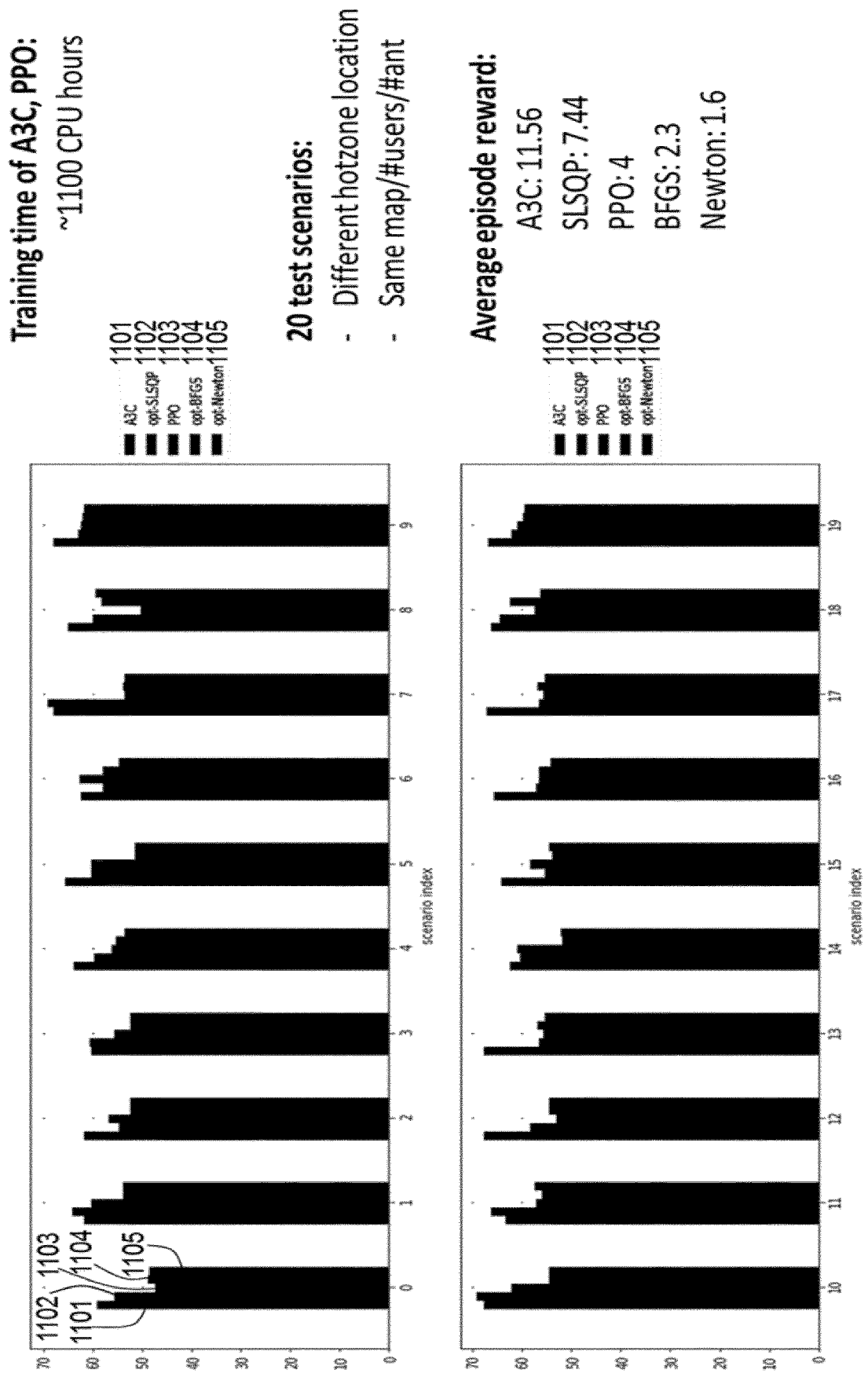
FIG. 11 is a schematic diagram depicting an example of a baseline reward comparison with respect to different algorithms, according to embodiments herein.
Figure 12:
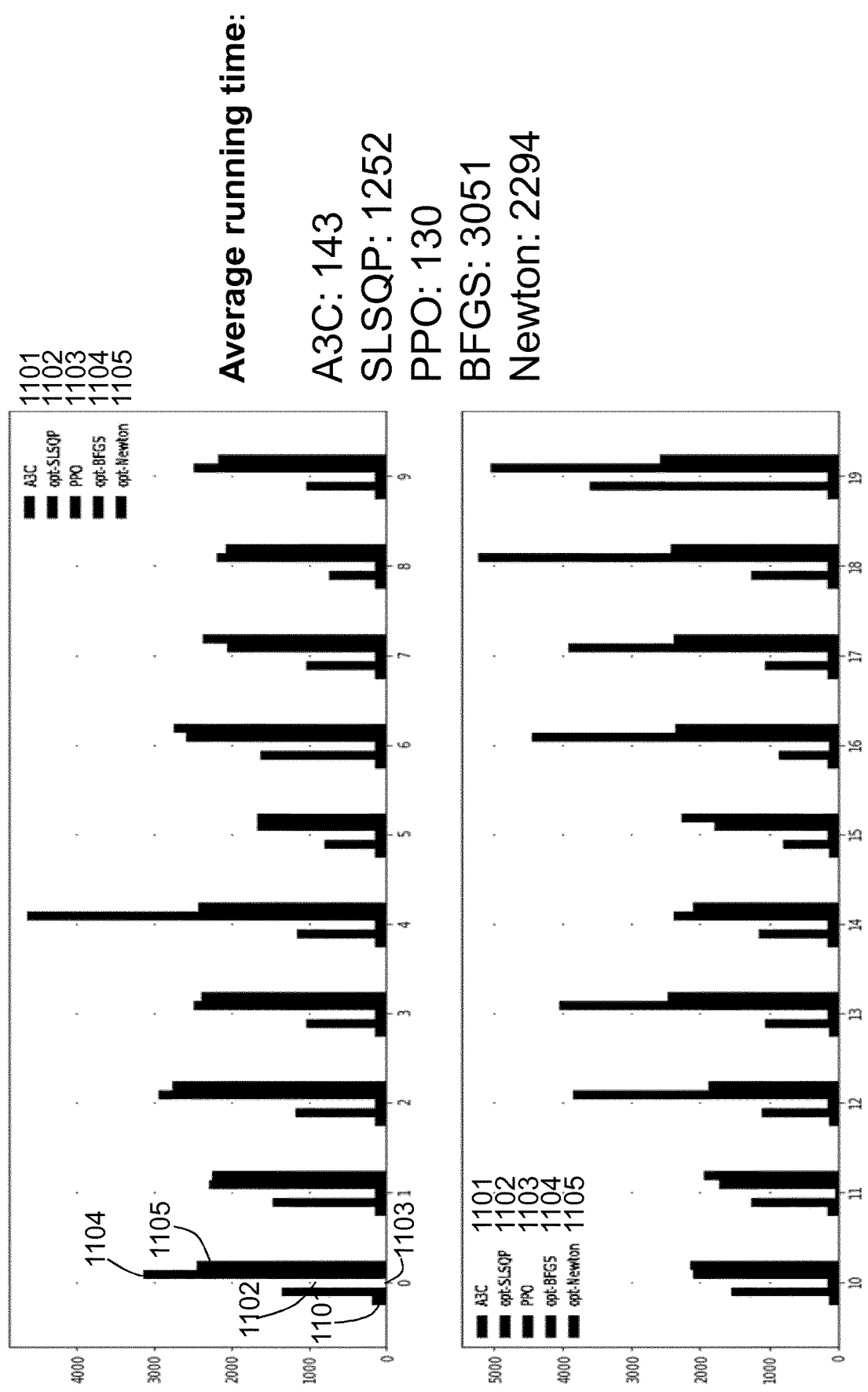
FIG. 12 is a schematic diagram depicting an example of a baseline time, in seconds, comparison with respect to different algorithms, according to embodiments herein.

FIG. 11 and FIG. 12 describe the preliminary results in terms of rewards and time.

FIG. 11 is a graphical representation showing the performance of different algorithms in Action 403, according to embodiments herein. In particular, the graphs represent a baseline reward comparison with respect to the different algorithms scipy.optimize, as described in https://docs.s-cipy.org/doc/scipy/reference/optimize.html. The algorithms are: A3C 1101, SLSQP 1102, PPO 1103, BFGS 1104 and Newton 1105. The number of episode rewards, which may be understood to indicate how well the algorithm may learn by episode, for 20 different scenarios 0-19, are represented in the vertical axis. Each of the 20 different test scenarios correspond to different hotzone locations, that is, different parts of the deployment of the radio access network 310, but the same map, the same number of users (#users), and the same number of antennas (#ant). As indicated in FIG. 11, the average episode reward for each of the depicted algorithms is: A3C: 11.56, SLSQP: 7.44, PPO: 4, BFGS: 2.3, Newton: 1.6, indicating that A3C learns better than the other algorithms.

FIG. 12 is another graphical representation showing the performance of different algorithms in Action 403, according to embodiments herein. In particular, the graphs represent a baseline time (seconds) comparison with respect to the different algorithms in the scipy.optimize python library. The algorithms are: A3C 1101, SLSQP 1102, PPO 1103, BFGS 1104 and Newton 1105. The graphs represent the running time, for the same 20 different scenarios described in FIG. 11. As indicated in FIG. 12, the average running time for each of the depicted algorithms is: A3C: 143, SLSQP: 1252, PPO: 130, BFGS: 3051, Newton: 2294 indicating that A3C runs faster than the other algorithms.

The system described herein may be understood to comprise an RL network planning/controller solution. The solution has been described as one combined system, although different components of the system may perform different operations. Differences are highlighted between planning phase usages and adaptive optimization.

Cloud Implementation

Figure 13:
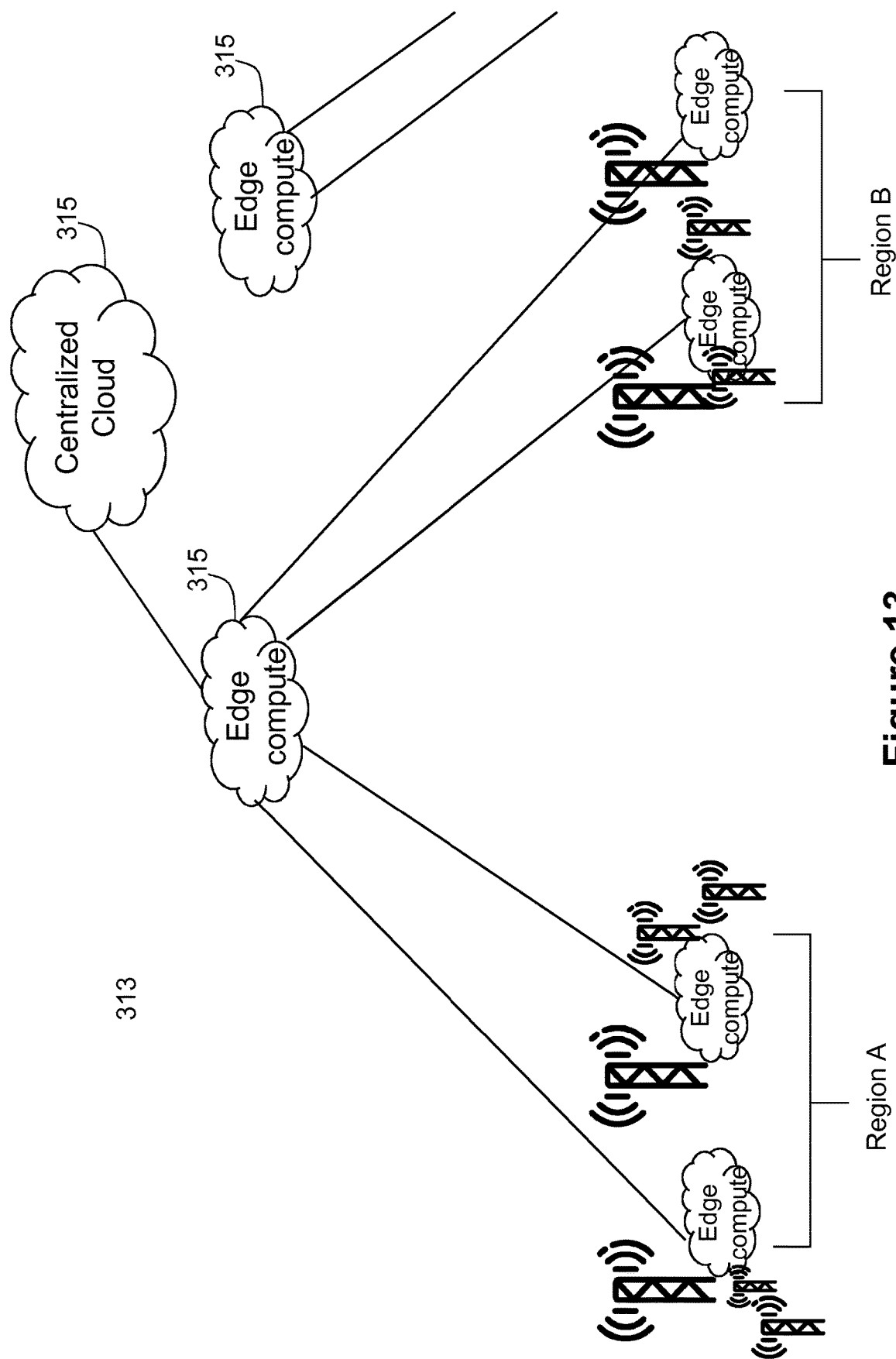
FIG. 13 is a schematic diagram depicting an example of a cloud implementation, according to embodiments herein.

The system described in this document may be deployed in centralized cloud and edge cloud configuration. FIG. 13 depicts an example of a hierarchical cloud compute deployment of the one or more third network nodes 313, where the algorithm performed by each of the one or more third network nodes 313 may run at regional levels, then models may be combined at a higher level edge compute layer connecting multiple regions, and a centralized compute may leverage all the learnings for a more global model. Further, allowing an RL at regional levels may be more scalable and may lead to more accurate RL models adapted to the infrastructures, traffic, and geographical conditions of that region. Moreover, the simulator used, as a digital twin, may be further tuned per region to offer a better representation of the actual environment in that region.

In accordance with the description provided, novel aspects of the herein disclosed techniques may be understood to include an RL system for continuous optimization of one or more RAN parameters, e.g., antenna tilt, and RAN planning, an RL system to adjust RAN parameters, and an RL system to adjust antenna tilt.

According to the foregoing, there are, proposed herein, various embodiments which address one or more of the issues disclosed herein. Certain embodiments may provide one or more of the following technical advantages. Embodiments herein may be understood to make it possible that no expert in the loop may be needed for the training phase. Embodiments herein further allow optimization of very complex network scenarios, that are not possible by a human operator. Embodiments herein further allow learning of environment-specific features and optimizing of such features per region.

Figure 14:
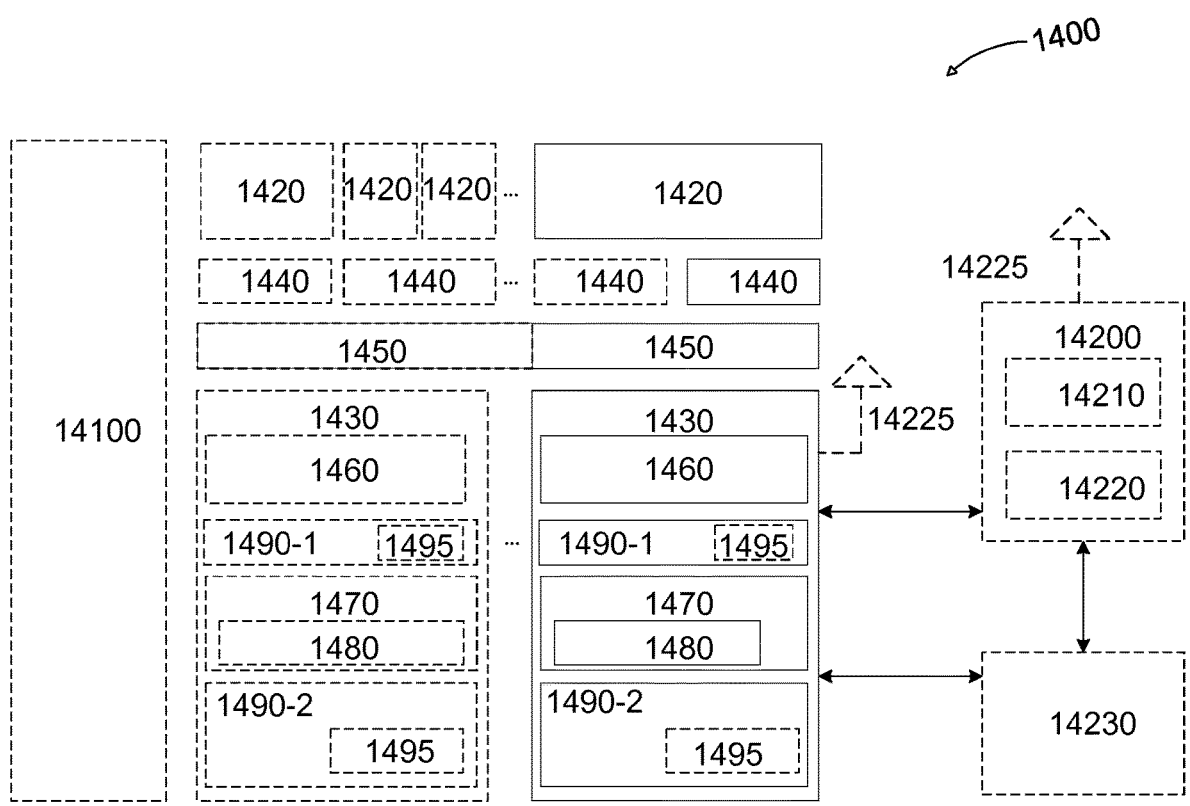
FIG. 14 is a schematic diagram depicting an example of a virtualization environment in accordance with some embodiments herein.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be affected with the use of control system 14230 which may alternatively be used for communication between the hardware nodes 1430 and radio units 14200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
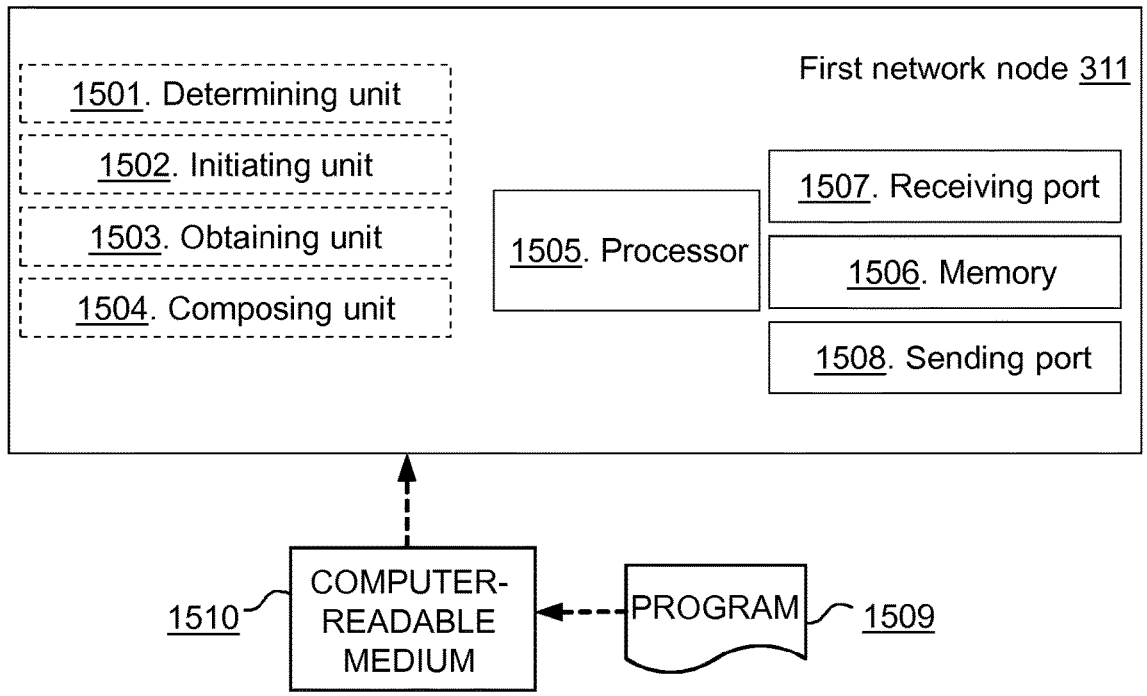
FIG. 15 is a schematic block diagram illustrating two non-limiting examples, a) and b), of a first network node, according to embodiments herein.
Figure 15:
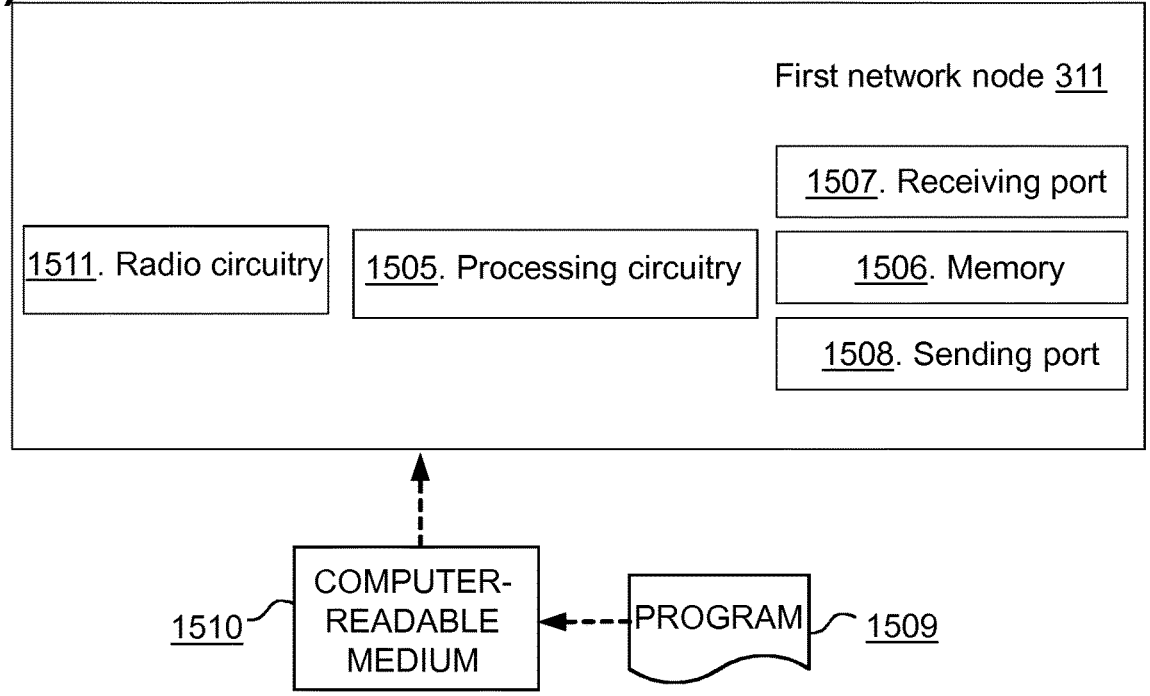

FIG. 15 depicts two different examples in panels a) and b), respectively, of the arrangement that the first network node 311 may comprise to perform the method actions described above in relation to FIG. 7. In some embodiments, the first network node 311 may comprise the following arrangement depicted in FIG. 15a. The first network node 311 may be understood to be configured to handle the performance of the radio access network 310. The radio access network 310 is configured to comprise the one or more radio network nodes 320. The first network node 311 is configured to operate in the communications network 300.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 311, and will thus not be repeated here. For example, at least one of the one or more parameters may be, e.g., antenna tilt.

In FIG. 15, optional modules are indicated with dashed boxes.

The first network node 311 is configured to perform the determining of Action 703, e.g. by means of a determining unit 1501 within the first network node 311, configured to determine the configuration of the one or more parameters in the radio access network 310. To determine is configured to be based on the one or more machine-implemented reinforcement learning procedures to optimize the performance of the radio access network 310 based on the one or more parameters. The one or more machine-implemented reinforcement learning procedures are further configured to be based on at least one of: i) the one or more physical characteristics of the deployment of the radio access network 310, ii) the one or more radio characteristics of the radio access network 310, and iii) the location of users or the traffic load in the radio access network 310.

The first network node 311 is also configured to perform the initiating providing of Action 704, e.g. by means of an initiating unit 1502 within the first network node 311, configured to initiate providing the one or more indicators of the determined configuration to the second network node 312 configured to operate in the communications network.

In some embodiments, to determine may be configured to be based on at least one of: a) the first set of simulated data configured to be obtained in the first training phase of the one or more machine-implemented reinforcement learning procedures, and b) the second set of real data configured to be obtained in the second training phase of the one or more machine-implemented reinforcement learning procedures. The second training phase may be configured to be based on the result of the first training phase.

In some embodiments, the first network node 311 may be further configured to perform the obtaining of Action 701, e.g. by means of an obtaining unit 1503 within the first network node 311, configured to obtain, respectively, from each of one or more third network nodes 313 configured to operate in the communications network 300, a respective indication of a respective outcome of a respective machine-implemented reinforcement learning procedure of the one or more machine-implemented reinforcement learning procedures. Each of the respective machine-implemented reinforcement learning procedures may be configured to be based on respective data configured to be collected from a respective subset 330 of the one or more radio network nodes 320. Each respective subset 330 may be cover different parts of the deployment. To determine may be configured to be based on the obtained one or more respective indications.

The one or more machine-implemented reinforcement learning procedures may be configured to be based on data. In some embodiments, the data may be configured to be structured in at least one of: a) the one or more two dimensional matrices, wherein each of the two dimensional matrices comprises information regarding one of the one or more parameters, and one of: i) the one of the one or more physical characteristics of the deployment, ii) the one of the one or more radio characteristics of the radio access network 310, and iii) the location of users or traffic load in the radio access network 310; b) the one or more three dimensional matrices, wherein each of the three dimensional matrices comprises information regarding one of the one or more parameters and one of: i) the two or more of the one or more physical characteristics of the deployment, ii) the two of the one or more radio characteristics of the radio access network 310, and iii) the location of users or the traffic load in the radio access network 310, and c) the one or more four dimensional matrices. Each of the four dimensional matrices may be based on the combination of one or more of: i) the one or more two dimensional matrices and ii) the one or more three dimensional matrices.

In some embodiments, the first network node 311 may be further configured to perform the composing of Action 702, e.g., by means of a composing unit 1504 within the first network node 311, configured to compose the information into the at least one of: a) the one or more two dimensional matrices, b) the one or more three dimensional matrices, and c) the one or more four dimensional matrices.

In some embodiments, each matrix may be configured to correspond to a particular geographical segment of the deployment.

In some embodiments, the data may be configured to comprise at least one of: a) the simulated data and b) the real data.

The embodiments herein in the first network node 311 may be implemented through one or more processors, such as a processor 1505 in the first network node 311 depicted in FIG. 15a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 311. One such carrier may be in the form of a CD ROM disc. It is however feasible with other data carriers such as a memory stick. The computer program code may furthermore be provided as pure program code on a server and downloaded to the first network node 311.

The first network node 311 may further comprise a memory 1506 comprising one or more memory units. The memory 1506 is arranged to be used to store obtained information, store data, configurations, schedulings, and applications etc. to perform the methods herein when being executed in the first network node 311.

In some embodiments, the first network node 311 may receive information from, e.g., the second network node 312 and/or any of the one or more third network nodes 313, through a receiving port 1507. In some embodiments, the receiving port 1507 may be, for example, connected to one or more antennas in first network node 311. In other embodiments, the first network node 311 may receive information from another structure in the communications network 300 through the receiving port 1507. Since the receiving port 1507 may be in communication with the processor 1505, the receiving port 1507 may then send the received information to the processor 1505. The receiving port 1507 may also be configured to receive other information.

The processor 1505 in the first network node 311 may be further configured to transmit or send information to e.g., the second network node 312 and/or any of the one or more third network nodes 313, or another structure in the communications network 300, through a sending port 1508, which may be in communication with the processor 1505, and the memory 1506.

Those skilled in the art will also appreciate that the determining unit 1501, the initiating unit 1502, the obtaining unit 1503, and the composing unit 1504 described above may refer to a combination of analog and digital modules, and/or one or more processors configured with software and/or firmware, e.g., stored in memory, that, when executed by the one or more processors such as the processor 1505, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1501-1504 described above may be implemented as one or more applications running on one or more processors such as the processor 1505.

Thus, the methods according to the embodiments described herein for the first network node 311 may be respectively implemented by means of a computer program 1509 product, comprising instructions, i.e., software code portions, which, when executed on at least one processor 1505, cause the at least one processor 1505 to carry out the actions described herein, as performed by the first network node 311. The computer program 1509 product may be stored on a computer-readable storage medium 1510. The computer-readable storage medium 1510, having stored thereon the computer program 1509, may comprise instructions which, when executed on at least one processor 1505, cause the at least one processor 1505 to carry out the actions described herein, as performed by the first network node 311. In some embodiments, the computer-readable storage medium 1510 may be a non-transitory computer-readable storage medium, such as a CD ROM disc, or a memory stick. In other embodiments, the computer program 1509 product may be stored on a carrier containing the computer program 1509 just described, wherein the carrier is one of an electronic signal, optical signal, radio signal, or the computer-readable storage medium 1510, as described above.

The first network node 311 may comprise a communication interface configured to facilitate communications between the first network node 311 and other nodes or devices, e.g., the second network node 312 and/or any of the one or more third network nodes 313. The interface may, for example, include a transceiver configured to transmit and receive radio signals over an air interface in accordance with a suitable standard.

In other embodiments, the first network node 311 may comprise the following arrangement depicted in FIG. 15b. The first network node 311 may comprise a processing circuitry 1505, e.g., one or more processors such as the processor 1505, in the first network node 311 and the memory 1506. The first network node 311 may also comprise a radio circuitry 1511, which may comprise e.g., the receiving port 1507 and the sending port 1508. The processing circuitry 1511 may be configured to, or operable to, perform the method actions according to FIG. 7, in a similar manner as that described in relation to FIG. 15a. The radio circuitry 1511 may be configured to set up and maintain at least a wireless connection with the second network node 312 and/or any of the one or more third network nodes 313. Circuitry may be understood herein as a hardware component.

Hence, embodiments herein also relate to the first network node 311 comprising the processing circuitry 1505 and the memory 1506, said memory 1506 containing instructions executable by said processing circuitry 1505, whereby the first network node 311 is operative to determine the configuration of the one or more parameters in the radio access network 310; wherein to determine is configured to be based on the one or more machine-implemented reinforcement learning procedures to optimize the performance of the radio access network 310 based on the one or more parameters; wherein the one or more machine-implemented reinforcement learning procedures are further configured to be based on at least one of: i) the one or more physical characteristics of the deployment of the radio access network 310, ii) the one or more radio characteristics of the radio access network 310, and iii) the location of users or traffic load in the radio access network 310. The first network node 311 is also operative to initiate providing the one or more indicators of the determined configuration to the second network node 312 configured to operate in the communications network 300.

In some embodiments, the first network node 311 may be further operative to obtain, respectively, from each of the one or more third network nodes 313 configured to operate in the communications network 300, the respective indication of the respective outcome of the respective machine-implemented reinforcement learning procedure of the one or more machine-implemented reinforcement learning procedures, wherein each of the respective machine-implemented reinforcement learning procedures may be configured to be based on respective data configured to be collected from the respective subset 330 of the one or more radio network nodes 320, each respective subset 330 covering different parts of the deployment. To determine may be configured to be based on the obtained one or more respective indications.

In some embodiments, the one or more machine-implemented reinforcement learning procedures may be configured to be based on data, the data being configured to be structured in at least one of:

a. the one or more two dimensional matrices, wherein each of the two dimensional matrices comprises information regarding one of the one or more parameters, and one of: i) one of the one or more physical characteristics of the deployment, ii) one of the one or more radio characteristics of the radio access network 310, and iii) the location of users or traffic load in the radio access network 310, b. the one or more three dimensional matrices, wherein each of the three dimensional matrices comprises information regarding one of the one or more parameters and one of: i) two or more of the one or more physical characteristics of the deployment, ii) two of the one or more radio characteristics of the radio access network 310, and iii) the location of users or traffic load in the radio access network 310, and c. the one or more four dimensional matrices, wherein each of the four dimensional matrices is based on a combination of one or more of: i) the one or more two dimensional matrices and ii) the one or more three dimensional matrices.

In some embodiments, the first network node 311 may be further operative to compose the information into the at least one of: a) the one or more two dimensional matrices, b) the one or more three dimensional matrices, and c) the one or more four dimensional matrices.

In some embodiments, each matrix may be configured to correspond to the particular geographical segment of the deployment.

In some embodiments, the data may be configured to comprise at least one of: a) simulated data and b) real data.

In some embodiments, to determine may be configured to be based on at least one of: a) the first set of simulated data configured to be obtained in a first training phase of the one or more machine-implemented reinforcement learning procedures, and b) the second set of real data configured to be obtained in a second training phase of the one or more machine-implemented reinforcement learning procedures, wherein the second training phase may be configured to be based on a result of the first training phase.

In some embodiments, at least one of the one or more parameters may be antenna tilt.

Figure 16:
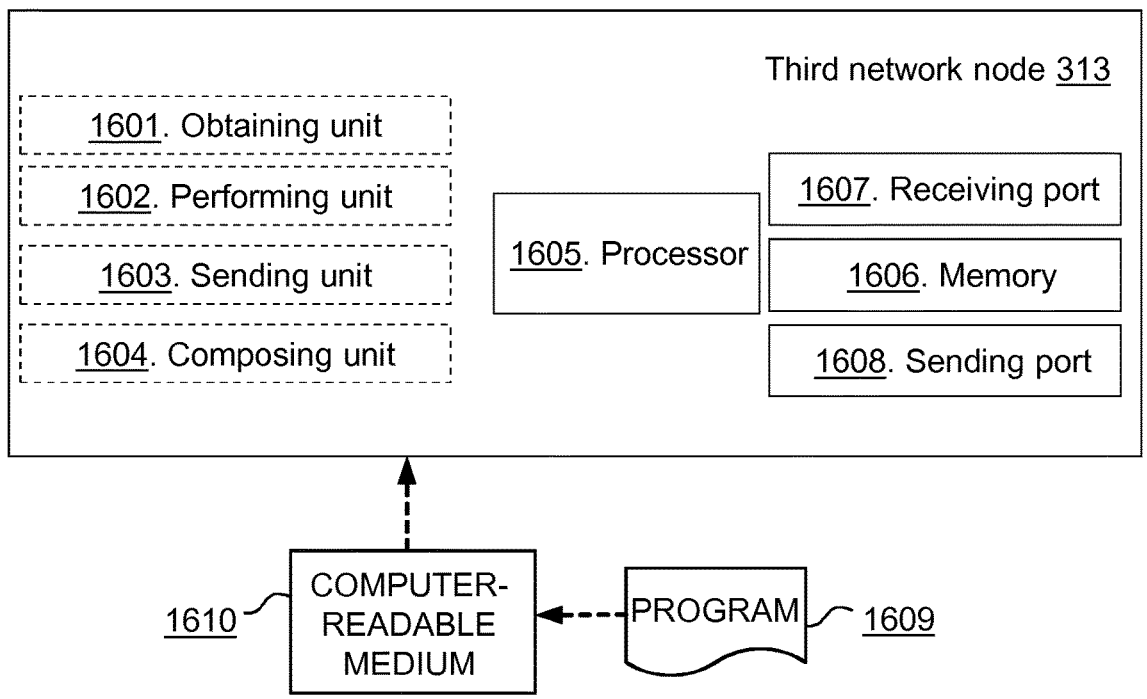
FIG. 16 is a schematic block diagram illustrating two non-limiting examples, a) and b), of a third network node, according to embodiments herein.
Figure 16:
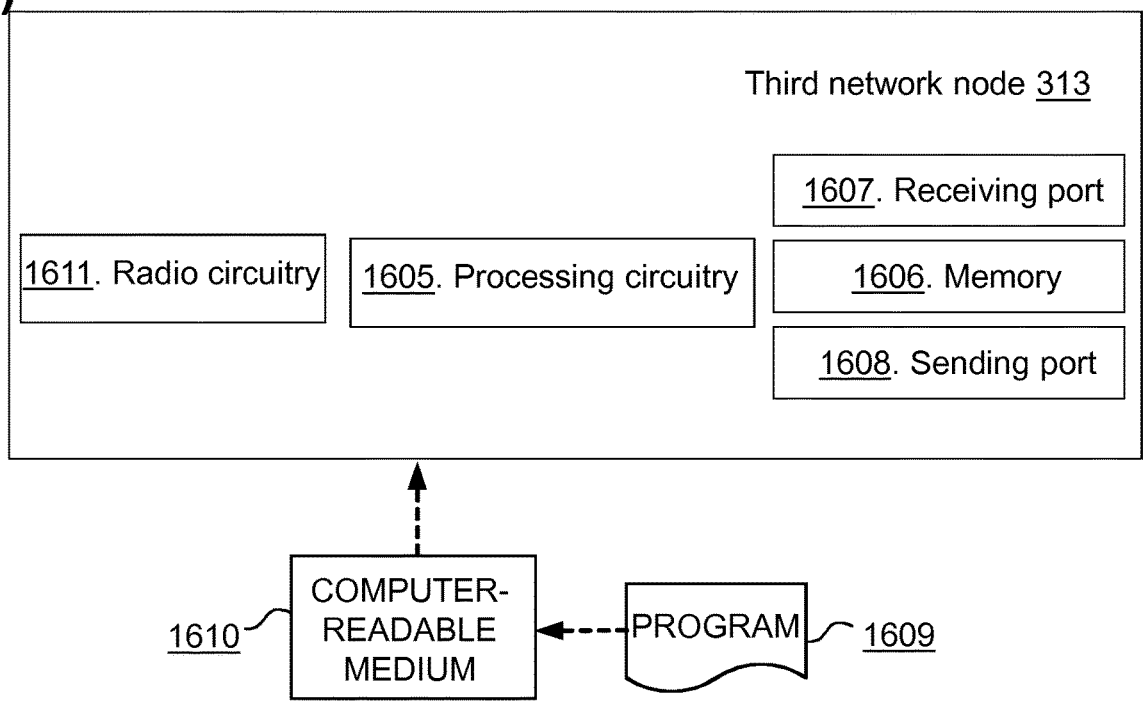

FIG. 16 depicts two different examples in panels a) and b), respectively, of the arrangement that the third network node 313 may comprise to perform the method actions described above in relation to FIG. 4. In some embodiments, the third network node 313 may comprise the following arrangement depicted in FIG. 16*a*. The third network node 313 may be understood to be configured to handle the performance of the radio access network 310. The radio access network 310 is configured to comprise the one or more radio network nodes 320. The third network node 313 is configured to operate in the communications network 300.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the third network node 313, and will thus not be repeated here. For example, at least one of the one or more parameters may be, e.g., antenna tilt.

In FIG. 16, optional modules are indicated with dashed boxes.

The third network node 313 is configured to perform the obtaining of Action 401, e.g. by means of an obtaining unit 1601 within the third network node 313, configured to obtain the data configured to be collected from the respective subset 330 of the radio network nodes 320. The respective subset 330 is configured to cover the part of the deployment of the radio access network 310 being configured to have the first subset of at least one of: i) the one or more physical characteristics of the deployment of the radio access network 310, ii) the one or more radio characteristics of the radio access network 310, and iii) the location of users or the traffic load. The data is configured to indicate one or more parameters in the radio access network 310.

The third network node 313 is also configured to perform the performing of Action 403, e.g. by means of a performing unit 1602 within the third network node 313, configured to perform the machine-implemented reinforcement learning procedure, based on the obtained data, to optimize the performance of the radio access network 310 based on the one or more parameters.

The third network node 313 is further configured to perform the sending of Action 404, e.g. by means of a sending unit 1603 within the third network node 313, configured to send the indication of the outcome of the machine-implemented reinforcement learning procedure configured to be performed, to the first network node 311 configured to operate in the communications network 300.

In some embodiments, the third network node 313 may be further configured to perform the composing of Action 402, e.g. by means of a composing unit 1604 within the third network node 313, configured to compose the data configured to be obtained into the at least one of the following structures a), b) and c). According to option a) the one or more two dimensional matrices, wherein each of the two dimensional matrices comprises information regarding one of the one or more parameters, and one of: i) the one of the one or more physical characteristics of the deployment, ii) the one of the one or more radio characteristics of the radio access network 310, and iii) the location of users or the traffic load in the radio access network 310; According to option b), the one or more three dimensional matrices, wherein each of the three dimensional matrices comprises information regarding one of the one or more parameters and one of: i) the two or more of the one or more physical characteristics of the deployment, ii) the two of the one or more radio characteristics of the radio access network 310, and iii) the location of users or the traffic load in the radio access network 310; and according to option c) the one or more four dimensional matrices, wherein each of the four dimensional matrices is based on a combination of one or more of: i) the one or more two dimensional matrices, and ii) the one or more three dimensional matrices. The machine-implemented reinforcement learning procedure may be configured to be performed further based on the composed data.

In some embodiments, each matrix may be configured to correspond to a particular geographical segment of the deployment.

In other embodiments, the data configured to be obtained may comprise at least one of: a) simulated data and b) real data.

The machine-implemented reinforcement learning procedure may be further based on at least one of: a) the first set of simulated data configured to be obtained in the first training phase of the machine-implemented reinforcement learning procedure, and b) the second set of real data configured to be obtained in a second training phase of the machine-implemented reinforcement learning procedure. The second training phase may be configured to be based on the result of the first training phase.

The embodiments herein in the third network node 313 may be implemented through one or more processors, such as a processor 1605 in the third network node 313 depicted in FIG. 16a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the third network node 313. One such carrier may be in the form of a CD ROM disc. It is however feasible with other data carriers such as a memory stick. The computer program code may furthermore be provided as pure program code on a server and downloaded to the third network node 313.

The third network node 313 may further comprise a memory 1606 comprising one or more memory units. The memory 1606 is arranged to be used to store obtained information, store data, configurations, schedulings, and applications etc. to perform the methods herein when being executed in the third network node 313.

In some embodiments, the third network node 313 may receive information from, e.g., the first network node 311 and/or any of the one or more radio network nodes 320, through a receiving port 1607. In some embodiments, the receiving port 1607 may be, for example, connected to one or more antennas in third network node 313. In other embodiments, the third network node 313 may receive information from another structure in the communications network 300 through the receiving port 1607. Since the receiving port 1607 may be in communication with the processor 1605, the receiving port 1607 may then send the received information to the processor 1605. The receiving port 1607 may also be configured to receive other information.

The processor 1605 in the third network node 313 may be further configured to transmit or send information to e.g., the first network node 311 and/or any of the one or more radio network nodes 320, or another structure in the communications network 300, through a sending port 1608, which may be in communication with the processor 1605, and the memory 1606.

Those skilled in the art will also appreciate that the obtaining unit 1601, the performing unit 1602, the sending unit 1603, and the composing unit 1604 described above may refer to a combination of analog and digital modules, and/or one or more processors configured with software and/or firmware, e.g., stored in memory, that, when executed by the one or more processors such as the processor 1605, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1601-1604 described above may be implemented as one or more applications running on one or more processors such as the processor 1605.

Thus, the methods according to the embodiments described herein for the third network node 313 may be respectively implemented by means of a computer program 1609 product, comprising instructions, i.e., software code portions, which, when executed on at least one processor 1605, cause the at least one processor 1605 to carry out the actions described herein, as performed by the third network node 313. The computer program 1609 product may be stored on a computer-readable storage medium 1610. The computer-readable storage medium 1610, having stored thereon the computer program 1609, may comprise instructions which, when executed on at least one processor 1605, cause the at least one processor 1605 to carry out the actions described herein, as performed by the third network node 313. In some embodiments, the computer-readable storage medium 1610 may be a non-transitory computer-readable storage medium, such as a CD ROM disc, or a memory stick. In other embodiments, the computer program 1609 product may be stored on a carrier containing the computer program 1609 just described, wherein the carrier is one of an electronic signal, optical signal, radio signal, or the computer-readable storage medium 1610, as described above.

The third network node 313 may comprise a communication interface configured to facilitate communications between the third network node 313 and other nodes or devices, e.g., the third network node 313 and/or the user equipment 130. The interface may, for example, include a transceiver configured to transmit and receive radio signals over an air interface in accordance with a suitable standard.

In other embodiments, the third network node 313 may comprise the following arrangement depicted in FIG. 16b. The third network node 313 may comprise a processing circuitry 1605, e.g., one or more processors such as the processor 1605, in the third network node 313 and the memory 1606. The third network node 313 may also comprise a radio circuitry 1611, which may comprise e.g., the receiving port 1607 and the sending port 1608. The processing circuitry 1611 may be configured to, or operable to, perform the method actions according to FIG. 4, in a similar manner as that described in relation to FIG. 16a. The radio circuitry 1611 may be configured to set up and maintain at least a wireless connection with the first network node 311 and/or any of the one or more radio network nodes 320. Circuitry may be understood herein as a hardware component.

Hence, embodiments herein also relate to the third network node 313 comprising the processing circuitry 1605 and the memory 1606, said memory 1606 containing instructions executable by said processing circuitry 1605, whereby the third network node 313 is operative to obtain data configured to be collected from the respective subset 330 of the radio network nodes 320, the respective subset 330 being configured to cover a part of a deployment of the radio access network 310 being configured to have the first subset of at least one of: i) one or more physical characteristics of the deployment of the radio access network 310, ii) one or more radio characteristics of the radio access network 310, and iii) the location of users or traffic load, the data being configured to indicate one or more parameters in the radio access network 310. The third network node 313 is also operative to perform the machine-implemented reinforcement learning procedure, based on the obtained data, to optimize the performance of the radio access network 310 based on the one or more parameters. The third network node 313 is further operative to send the indication of the outcome of the machine-implemented reinforcement learning procedure configured to be performed, to the first network node 311 configured to operate in the communications network 300.

In some embodiments, the third network node 313 may be further operative to compose the data configured to be obtained into the at least one of the following structures: a) the one or more two dimensional matrices, wherein each of the two dimensional matrices comprises information regarding one of the one or more parameters, and one of: i) one of the one or more physical characteristics of the deployment, ii) one of the one or more radio characteristics of the radio access network 310, and iii) the location of users or the traffic load in the radio access network 310, b) the one or more three dimensional matrices, wherein each of the three dimensional matrices comprises information regarding one of the one or more parameters and one of: i) two or more of the one or more physical characteristics of the deployment, ii) two of the one or more radio characteristics of the radio access network 310, and iii) the location of users or the traffic load in the radio access network 310, and c) the one or more four dimensional matrices, wherein each of the four dimensional matrices is based on a combination of one or more of: i) the one or more two dimensional matrices and ii) the one or more three dimensional matrices, and wherein the machine-implemented reinforcement learning procedure may be configured to be performed further based on the composed data.

In some embodiments, each matrix may be configured to correspond to the particular geographical segment of the deployment.

In some embodiments, the data configured to be obtained may comprise at least one of: a) simulated data and b) real data.

In some embodiments, the machine-implemented reinforcement learning procedure may be further based on at least one of: a) the first set of simulated data configured to be obtained in the first training phase of the machine-implemented reinforcement learning procedure, and b) the second set of real data configured to be obtained in the second training phase of the machine-implemented reinforcement learning procedure, wherein the second training phase is configured to be based on the result of the first training phase.

In some embodiments, at least one of the one or more parameters may be antenna tilt.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

REFERENCES

[1] Zheng, K., Yang, Z., Zhang, K., Chatzimisios, P., Yang, K. and Xiang, W., 2016. Big data-driven optimization for mobile networks toward 5G. IEEE network, 30(1), pp. 44-51. [Available at http://shop.tarjomeplus.com/Uploads/site-1/DownloadDoc/1240.pdf]

[2] Zhang, C., Patras, P. and Haddadi, H., 2018. Deep Learning in Mobile and Wireless Networking: A Survey. arXiv preprint arXiv:1803.04311. [Available at https://arxiv.org/pdf/1803.04311.pdf]

[3] Evans, R. and Gao, J., 2016. DeepMind AI Reduces Google Data Centre Cooling Bill by 40% [Available at https://deepmind.com/blog/deepmind-ai-reduces-google-data-centre-cooling-bill-40/]

[4] Chinchali, S., Hu, P., Chu, T., Sharma, M., Bansal, M., Misra, R., Pavone, M. and Sachin, K., 2018. Cellular network traffic scheduling with deep reinforcement learning. In National Conference on Artificial Intelligence (AAAI). [Available at https://asl.stanford.edu/wp-content/papercite-data/pdf/Chinchali.ea.AAA118.pdf]

[5] O'Shea, T. J. and Clancy, T. C., 2016. Deep reinforcement learning radio control and signal detection with KeRLym, a Gym RL agent. arXiv preprint arXiv: 1605.09221. [Available at https://arxiv.org/pdf/1605.09221.pdf]

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
A3C Asynchronous Advantage Actor-Critic
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CPRI Common Public Radio Interface
CQI Channel Quality information
C-RAN Cloud-RAN (or Centralized-RAN)
C-RNTI Cell RNTI
CSI Channel State Information
DCCH Dedicated Control Channel
DL Downlink DM Demodulation
DMRS Demodulation Reference Signal
DRX Discontinuous Reception
DTX Discontinuous Transmission
DTCH Dedicated Traffic Channel
DUT Device Under Test
ECGI Evolved CGI
E-CID Enhanced Cell-ID (positioning method)
eNB E-UTRAN NodeB
ePDCCH enhanced Physical Downlink Control Channel
E-SMLC Evolved-Serving Mobile Location Centre
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HRPD High Rate Packet Data
HSPA High Speed Packet Access
IoT Internet of Things
KPI Key Performance Indicators
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDP Markov Decision Problem
MDT Minimization of Drive Tests
MIB Master Information Block
MME Mobility Management Entity
MNO Mobile Network Operator
MSC Mobile Switching Center
MTC Machine Type Communications
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RET Remote Electrical Tilt
RL Reinforcement Learning
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCell Secondary Cell
SCH Synchronization Channel
SDU Service Data Unit
SFN System Frame Number
SGW Serving Gateway
SI System Information
SIB System Information Block
SINR Signal to Interference Noise Ratio
SNR Signal to Noise Ratio
SON Self-Organizing Networks
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method, performed by a first network node, for handling a performance of a radio access network comprising one or more radio network nodes, the first network node operating in a communications network, the method comprising:

obtaining, respectively, from each of one or more third network nodes operating in the communications network, a respective indication of a respective outcome of a respective machine-implemented reinforcement learning procedure of one or more machine-implemented reinforcement learning procedures, wherein each of the respective machine-implemented reinforcement learning procedures is based on respective data collected from a respective subset of the one or more radio network nodes, each respective subset covering different parts of the deployment;

determining a configuration of one or more parameters in the radio access network, the determining being based on the one or more machine-implemented reinforcement learning procedures to optimize the performance of the radio access network based on the one or more parameters, wherein the one or more machine-implemented reinforcement learning procedures are further based on at least one of: i) one or more physical characteristics of a deployment of the radio access network, ii) one or more radio characteristics of the radio access network, and iii) a location of users or traffic load in the radio access network, wherein the determining is based on the obtained one or more respective indications, and wherein an algorithm performed by each of the one or more third network nodes runs at a regional level, and models are combined at a higher level edge compute layer connecting multiple regions; and initiating providing one or more indicators of the determined configuration to a second network node operating in the communications network.

2. The method according to claim 1, wherein the one or more machine-implemented reinforcement learning procedures are based on data, the data being structured in at least one of:

one or more two dimensional matrices, wherein each of the two dimensional matrices comprises information regarding one of the one or more parameters, and one of: i) one of the one or more physical characteristics of the deployment, ii) one of the one or more radio characteristics of the radio access network, and iii) the location of users or traffic load in the radio access network, one or more three dimensional matrices, wherein each of the three dimensional matrices comprises information regarding one of the one or more parameters and one of: i) two or more of the one or more physical characteristics of the deployment, ii) two of the one or more radio characteristics of the radio access network, and iii) the location of users or traffic load in the radio access network, and one or more four dimensional matrices, wherein each of the four dimensional matrices is based on a combination of one or more of: i) the one or more two dimensional matrices and ii) the one or more three dimensional matrices.

3. The method according to claim 2, wherein method further comprises:

composing the information into the at least one of:
the one or more two dimensional matrices,
the one or more three dimensional matrices, and
the one or more four dimensional matrices.

4. The method according to claim 2, wherein each matrix corresponds to a particular geographical segment of the deployment.

5. The method according to claim 2, wherein the data comprises at least one of: a) simulated data and b) real data.

6. The method according to claim 1, wherein the determining is based on at least one of:

a first set of simulated data obtained in a first training phase of the one or more machine-implemented reinforcement learning procedures, and a second set of real data obtained in a second training phase of the one or more machine-implemented reinforcement learning procedures, wherein the second training phase is based on a result of the first training phase.

7. The method according to claim 1, wherein at least one of the one or more parameters is antenna tilt.

8. A computer program, comprising instructions which, when executed on at least one processor, cause the at least one processor to carry out the method according to claim 1.

9. A non-transitory computer-readable storage medium, having stored thereon a computer program, comprising instructions which, when executed on at least one processor, cause the at least one processor to carry out the method according to claim 1.

10. A method, performed by a third network node, for handling a performance of a radio access network comprising one or more radio network nodes, the third network node operating in a communications network, the method comprising:

obtaining data collected from a respective subset of the radio network nodes, the respective subset covering a part of a deployment of the radio access network having a first subset of at least one of: i) one or more physical characteristics of the deployment of the radio access network, ii) one or more radio characteristics of the radio access network, and iii) a location of users or traffic load, the data indicating one or more parameters in the radio access network;

performing a machine-implemented reinforcement learning procedure, based on the obtained data, to optimize the performance of the radio access network based on the one or more parameters; and sending an indication of an outcome of the performed machine-implemented reinforcement learning procedure to a first network node operating in the communications network, wherein an algorithm performed by the third network node runs at a regional level, and is to be combined with models from each of other third network nodes at a higher level edge compute layer connecting multiple regions.

11. The method according to claim 10, wherein method further comprises:

composing the obtained data into the at least one of the following structures:

one or more two dimensional matrices, wherein each of the two dimensional matrices comprises information regarding one of the one or more parameters, and one of: i) one of the one or more physical characteristics of the deployment, ii) one of the one or more radio characteristics of the radio access network, and iii) the location of users or the traffic load in the radio access network, one or more three dimensional matrices, wherein each of the three dimensional matrices comprises information regarding one of the one or more parameters and one of: i) two or more of the one or more physical characteristics of the deployment, ii) two of the one or more radio characteristics of the radio access network, and iii) the location of users or the traffic load in the radio access network, and one or more four dimensional matrices, wherein each of the four dimensional matrices is based on a combination of one or more of: i) the one or more two dimensional matrices and ii) the one or more three dimensional matrices, and wherein the machine-implemented reinforcement learning procedure is performed further based on the composed data.

12. The method according to claim 11, wherein each matrix corresponds to a particular geographical segment of the deployment.

13. The method according to claim 10, wherein the obtained data comprises at least one of: a) simulated data and b) real data.

14. The method according to claim 10, wherein
the machine-implemented reinforcement learning procedure is further based on at least one of:

a first set of simulated data obtained in a first training phase of the machine-implemented reinforcement learning procedure, and a second set of real data obtained in a second training phase of the machine-implemented reinforcement learning procedure, wherein the second training phase is based on a result of the first training phase.

15. The method according to claim 10, wherein at least one of the one or more parameters is antenna tilt.

16. A computer program, comprising instructions which, when executed on at least one processor, cause the at least one processor to carry out the method according to claim 10.

17. A non-transitory computer-readable storage medium, having stored thereon a computer program, comprising instructions which, when executed on at least one processor, cause the at least one processor to carry out the method according to claim 10.

18. A first network node comprising a processing circuitry and a memory, said memory containing instructions executable by said processing circuitry, whereby the first network node is operative to:

obtain, respectively, from each of one or more third network nodes configured to operate in a communications network, a respective indication of a respective outcome of a respective machine-implemented reinforcement learning procedure of one or more machine-implemented reinforcement learning procedures, wherein each of the respective machine-implemented reinforcement learning procedures is configured to be based on respective data configured to be collected from a respective subset of the one or more radio network nodes, each respective subset covering different parts of the deployment, determine a configuration of one or more parameters in the radio access network, wherein to determine is configured to be based on the one or more machine-implemented reinforcement learning procedures to optimize the performance of the radio access network based on the one or more parameters, wherein the one or more machine-implemented reinforcement learning procedures are further configured to be based on at least one of: i) one or more physical characteristics of a deployment of the radio access network, ii) one or more radio characteristics of the radio access network, and iii) a location of users or traffic load in the radio access network, wherein to determine is configured to be based on the obtained one or more respective indications, and wherein an algorithm operative to be performed by each of the one or more third network nodes is operative to run at a regional level, and models are operative to be combined at a higher level edge compute layer operative to connect multiple regions, and initiate providing one or more indicators of the determined configuration to a second network node configured to operate in the communications network.

19. The first network node according to claim 18, wherein the one or more machine-implemented reinforcement learning procedures are configured to be based on data, the data being configured to be structured in at least one of:

one or more two dimensional matrices, wherein each of the two dimensional matrices comprises information regarding one of the one or more parameters, and one of: i) one of the one or more physical characteristics of the deployment, ii) one of the one or more radio characteristics of the radio access network, and iii) the location of users or traffic load in the radio access network, one or more three dimensional matrices, wherein each of the three dimensional matrices comprises information regarding one of the one or more parameters and one of: i) two or more of the one or more physical characteristics of the deployment, ii) two of the one or more radio characteristics of the radio access network, and iii) the location of users or traffic load in the radio access network, and one or more four dimensional matrices, wherein each of the four dimensional matrices is based on a combination of one or more of: i) the one or more two dimensional matrices and ii) the one or more three dimensional matrices.

20. The first network node according to claim 19, wherein first network node is further operative to:

compose the information into the at least one of:
the one or more two dimensional matrices,
the one or more three dimensional matrices, and
the one or more four dimensional matrices.

21. The first network node according to claim 19, wherein each matrix is configured to correspond to a particular geographical segment of the deployment.

22. The first network node according to claim 19, wherein the data is configured to comprise at least one of: a) simulated data and b) real data.

23. The first network node according to claim 18, wherein to determine is configured to be based on at least one of:

a first set of simulated data configured to be obtained in a first training phase of the one or more machine-implemented reinforcement learning procedures, and a second set of real data configured to be obtained in a second training phase of the one or more machine-implemented reinforcement learning procedures, wherein the second training phase is configured to be based on a result of the first training phase.

24. The first network node according to claim 18, wherein at least one of the one or more parameters is antenna tilt.

25. A third network node comprising a processing circuitry and a memory, said memory containing instructions executable by said processing circuitry, whereby the third network node is operative to:

obtain data configured to be collected from a respective subset of the radio network nodes, the respective subset being configured to cover a part of a deployment of the radio access network being configured to have a first subset of at least one of: i) one or more physical characteristics of the deployment of the radio access network, ii) one or more radio characteristics of the radio access network, and iii) a location of users or traffic load, the data being configured to indicate one or more parameters in the radio access network, perform a machine-implemented reinforcement learning procedure, based on the obtained data, to optimize the performance of the radio access network based on the one or more parameters, and send an indication of an outcome of the machine-implemented reinforcement learning procedure configured to be performed, to a first network node configured to operate in the communications network, wherein an algorithm operative to be performed by the third network node is operative to run at a regional level, and is operative to be combined with models from each of other third network nodes at a higher level edge compute layer operative to connect multiple regions.

26. The third network node according to claim 25, wherein the third network node is further operative to:

compose the data configured to be obtained into the at least one of the following structures:
- one or more two dimensional matrices, wherein each of the two dimensional matrices comprises information regarding one of the one or more parameters, and one of: i) one of the one or more physical characteristics of the deployment, ii) one of the one or more radio characteristics of the radio access network, and iii) the location of users or the traffic load in the radio access network,
- one or more three dimensional matrices, wherein each of the three dimensional matrices comprises information regarding one of the one or more parameters and one of: i) two or more of the one or more physical characteristics of the deployment, ii) two of the one or more radio characteristics of the radio access network, and iii) the location of users or the traffic load in the radio access network, and
- one or more four dimensional matrices, wherein each of the four dimensional matrices is based on a combination of one or more of: i) the one or more two dimensional matrices and ii) the one or more three dimensional matrices, and wherein the machine-implemented reinforcement learning procedure is configured to be performed further based on the composed data.

27. The third network node according to claim 26, wherein each matrix is configured to correspond to a particular geographical segment of the deployment.

28. The third network node according to claim 25, wherein the data configured to be obtained comprises at least one of: a) simulated data and b) real data.

29. The third network node according to claim 25, wherein the machine-implemented reinforcement learning procedure is further based on at least one of:
   a. a first set of simulated data configured to be obtained in a first training phase of the machine-implemented reinforcement learning procedure, and
   b. a second set of real data configured to be obtained in a second training phase of the machine-implemented reinforcement learning procedure, wherein the second training phase is configured to be based on a result of the first training phase.

30. The third network node according to claim 25, wherein at least one of the one or more parameters is antenna tilt.

* * * * *